(12) United States Patent
Fu et al.

(10) Patent No.: US 11,778,497 B2
(45) Date of Patent: Oct. 3, 2023

(54) SCRIPT REUSE DURING INTER-FREQUENCY OR INTER-RADIO ACCESS TECHNOLOGY MEASUREMENTS AND PAGING

(71) Applicant: QUALCOMM Incorporated, San Diego, CA (US)

(72) Inventors: Yu Fu, San Diego, CA (US); Nagendra Babu Bagam, San Diego, CA (US); Udayan Bhawnani, San Diego, CA (US); Ayyappan Ravichandran, San Diego, CA (US); Vikram Ramesh Babu, San Diego, CA (US); Nandu Sivadasan, Kochi (IN); Arvind Vardarajan Santhanam, San Diego, CA (US); Qian Ma, San Diego, CA (US); Sumit Kumar Singh, San Marcos, CA (US); Preeti Sivakumar, San Diego, CA (US); Vishal Hingorani, San Diego, CA (US); Prem Swaroop Kadavakuduru, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/383,762

(22) Filed: Jul. 23, 2021

(65) Prior Publication Data
US 2023/0023100 A1    Jan. 26, 2023

(51) Int. Cl.
*H04W 8/20*    (2009.01)
*H04W 24/10*    (2009.01)
*H04W 68/00*    (2009.01)

(52) U.S. Cl.
CPC ............. *H04W 24/10* (2013.01); *H04W 8/20* (2013.01); *H04W 68/005* (2013.01)

(58) Field of Classification Search
CPC ..... H04W 24/10; H04W 8/20; H04W 68/005; H04W 24/08; H04W 36/0088;
(Continued)

(56) References Cited

U.S. PATENT DOCUMENTS

| 2015/0350977 | A1* | 12/2015 | Xu | H04W 72/21 370/252 |
|---|---|---|---|---|
| 2021/0007033 | A1* | 1/2021 | Tada | H04W 36/06 |
| 2022/0345964 | A1* | 10/2022 | Ramachandra | H04W 36/305 |

\* cited by examiner

*Primary Examiner* — Chuong A Ngo
(74) *Attorney, Agent, or Firm* — Holland & Hart LLP

(57) ABSTRACT

Methods, systems, and devices for wireless communications are described. In a wireless communications system, a user equipment (UE) may be scheduled to perform a first measurement or paging activity associated with a target cell operating according to a first target cell configuration that is different from a serving cell operating according to a first serving cell configuration of the UE. In some cases, the UE may determine that the UE has performed a previous measurement or paging activity associated with the target cell while being served by the serving cell, the cells operating according to previous cell configurations. The UE may compare at least one of the first and previous target cell configurations or the first and previous serving cell configurations, and may perform the first measurement or paging activity using a script, where the script is either reused or rebuilt based on comparing the cell configurations.

30 Claims, 14 Drawing Sheets

(58) Field of Classification Search
CPC ..... H04W 8/183; H04W 76/16; H04W 68/00; H04W 76/28; H04W 88/06
See application file for complete search history.

SCRIPT REUSE DURING INTER-FREQUENCY OR INTER-RADIO ACCESS TECHNOLOGY MEASUREMENTS AND PAGING

FIELD OF TECHNOLOGY

The following relates to wireless communications, including script reuse during inter-frequency or inter-radio access technology (IRAT) measurements and paging.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may support multiple radio access technologies (RATs) or multiple subscriptions. In some cases, search and measurement procedures between different RATs or subscriptions could be improved.

SUMMARY

The described techniques relate to improved methods, systems, devices, and apparatuses that support script reuse during inter-frequency or inter-radio access technology (IRAT) measurements and paging. Generally, the described techniques provide for a user equipment (UE) to use power efficient inter-frequency or IRAT measurement and multiple subscriber identity module (MSIM) quick tuneaway (QTA) so that the UE may reuse scripts (e.g., predetermined sets of instructions for executing a paging or measurement activity) instead of regenerating a script each time that a retuning or measurement activity occurs. For example, the UE may save scripts and, upon being scheduled to make an inter-frequency or IRAT measurement or participate in an idle subscription paging activity, the UE may determine whether to reuse a saved script. The UE may save a script based on a comparison of the configurations (e.g., the frequency and bandwidths) of both a source cell (e.g., serving cell) of the UE supported by a first RAT or subscription and a target cell supported by a second RAT or subscription at the time of the saved script. If the configurations are the same, the UE may reuse the saved script. In some cases, even if the current configurations of the source cell and the target cell are the same, the UE may lack sufficient memory to run a pre-generated script, and as such, may regenerate a script to use for a measurement or paging activity.

A method for wireless communications at a user equipment (UE) is described. The method may include identifying that the UE is scheduled to perform a first measurement or paging activity associated with a target cell that is different from a serving cell of the UE, the target cell operating in accordance with a first target cell configuration and the serving cell operating in accordance with a first serving cell configuration, determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration, comparing at least one of the first target cell configuration with the previous target cell configuration or the first serving cell configuration with the previous serving cell configuration, and performing the first measurement or paging activity using a script, where a source of the script is based on the comparing.

An apparatus for wireless communications at a UE is described. The apparatus may include a processor, memory coupled with the processor, and instructions stored in the memory. The instructions may be executable by the processor to cause the apparatus to identify that the UE is scheduled to perform a first measurement or paging activity associated with a target cell that is different from a serving cell of the UE, the target cell operating in accordance with a first target cell configuration and the serving cell operating in accordance with a first serving cell configuration, determine that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration, compare at least one of the first target cell configuration with the previous target cell configuration or the first serving cell configuration with the previous serving cell configuration, and perform the first measurement or paging activity using a script, where a source of the script is based on the comparing.

Another apparatus for wireless communications at a UE is described. The apparatus may include means for identifying that the UE is scheduled to perform a first measurement or paging activity associated with a target cell that is different from a serving cell of the UE, the target cell operating in accordance with a first target cell configuration and the serving cell operating in accordance with a first serving cell configuration, means for determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration, means for comparing at least one of the first target cell configuration with the previous target cell configuration or the first serving cell configuration with the previous serving cell configuration, and means for performing the first measurement or paging activity using a script, where a source of the script is based on the comparing.

A non-transitory computer-readable medium storing code for wireless communications at a UE is described. The code may include instructions executable by a processor to identify that the UE is scheduled to perform a first measurement or paging activity associated with a target cell that is different from a serving cell of the UE, the target cell operating in accordance with a first target cell configuration and the serving cell operating in accordance with a first serving cell configuration, determine that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration, compare at least one of the first target cell configuration with the previous target cell configuration or the first serving cell configuration with the previous serving cell configuration, and perform the first measurement or paging activity using a script, where a source of the script is based on the comparing.

In some examples of the method, apparatuses, and non-transitory computer-readable medium described herein, identifying that the UE may be scheduled to perform the first measurement or paging activity may include operations, features, means, or instructions for determining that the first measurement or paging activity may be associated with an over-the-air (OTA) measurement gap for a single subscriber identity module (SIM) UE.

In some examples of the method, apparatuses, and non-transitory computer-readable medium described herein, identifying that the UE may be scheduled to perform the first measurement or paging activity may include operations, features, means, or instructions for determining that the first measurement or paging activity may be associated with an idle subscription QTA for an MSIM UE.

Some examples of the method, apparatuses, and non-transitory computer-readable medium described herein may further include operations, features, means, or instructions for determining the source of the script based on the comparing, where the source of the script may be either a first script generated in association with the first measurement or paging activity or a previous script generated in association with the previous measurement or paging activity.

In some examples of the method, apparatuses, and non-transitory computer-readable medium described herein, determining the source of the script may include operations, features, means, or instructions for comparing an amount of available memory at the UE with a memory usage of the previous script and selecting to use either the first script or the previous script based on the available memory and the memory usage.

In some examples of the method, apparatuses, and non-transitory computer-readable medium described herein, determining the source of the script may include operations, features, means, or instructions for selecting to use either the first script or the previous script based on whether retuning occurs between the first measurement or paging activity and the previous measurement or paging activity, each of the first measurement or paging activity and the previous measurement or paging activity occurring during OTA gaps.

In some examples of the method, apparatuses, and non-transitory computer-readable medium described herein, determining the source of the script may include operations, features, means, or instructions for selecting to use either the first script or the previous script based on a target frequency for the first measurement or paging activity during an OTA gap.

In some examples of the method, apparatuses, and non-transitory computer-readable medium described herein, determining the source of the script may include operations, features, means, or instructions for using a common entity during dual connectivity operations to monitor for the first target cell configuration on a first RAT and the first serving cell configuration on a second RAT, where the common entity may be common between first RAT operations of the UE and second RAT operations of the UE and selecting to use either the first script or the previous script based on monitoring by the common entity.

In some examples of the method, apparatuses, and non-transitory computer-readable medium described herein, comparing at least one of the first target cell configuration with the previous target cell configuration or the first serving cell configuration with the previous serving cell configuration may include operations, features, means, or instructions for comparing at least one of frequency values or bandwidth values of the first target cell configuration with the previous target cell configuration or of the first serving cell configuration with the previous serving cell configuration.

Some examples of the method, apparatuses, and non-transitory computer-readable medium described herein may further include operations, features, means, or instructions for refraining from adjusting a processor clock to turbo while performing the first measurement or paging activity using the previous script.

In some examples of the method, apparatuses, and non-transitory computer-readable medium described herein, the first measurement or paging activity and the previous measurement or paging activity may be for different OTA gap cycle measurements, connected discontinuous reception (CDRX) mode measurements, idle mode search and measurement, or a combination thereof.

In some examples of the method, apparatuses, and non-transitory computer-readable medium described herein, determining the source of the script may include operations, features, means, or instructions for using a common entity during tune-away from an active subscription to an idle subscription to determine whether the first script or the previous script may be to be used, where the common entity may be common between the active subscription and the idle subscription.

In some examples of the method, apparatuses, and non-transitory computer-readable medium described herein, using the common entity during tune-away from the active subscription to the idle subscription may include operations, features, means, or instructions for determining, via the common entity, that paging on the idle subscription, associated with the target cell, uses a same frequency as on the serving cell, which may be associated with the active subscription and selecting to use the previous script based on the same frequency being used on both the target cell and the serving cell.

In some examples of the method, apparatuses, and non-transitory computer-readable medium described herein, using the common entity during tune-away from the active subscription to the idle subscription may include operations, features, means, or instructions for determining, via the common entity, that measurements on the idle subscription, associated with the target cell, use a same frequency as on the serving cell, which may be associated with the active subscription and selecting to use the previous script based on the same frequency being used on both the target cell and the serving cell.

In some examples of the method, apparatuses, and non-transitory computer-readable medium described herein, using the common entity during tune-away from the active subscription to the idle subscription may include operations, features, means, or instructions for determining, via the common entity, that no reconfiguration may be applied between different wakeup cycles on either the active subscription or the idle subscription and selecting to use the previous script based on a lack of reconfiguration between different wakeup cycles.

In some examples of the method, apparatuses, and non-transitory computer-readable medium described herein, the first serving cell configuration and the previous serving cell configuration each include one of Long Term Evolution (LTE) operations, New Radio (NR) operations, or NR dual connectivity (ENDC) operations.

In some examples of the method, apparatuses, and non-transitory computer-readable medium described herein, the first target cell configuration and the previous target cell configuration each include one of LTE operations, NR operations, or ENDC operations.

DETAILED DESCRIPTION

Figure 1:
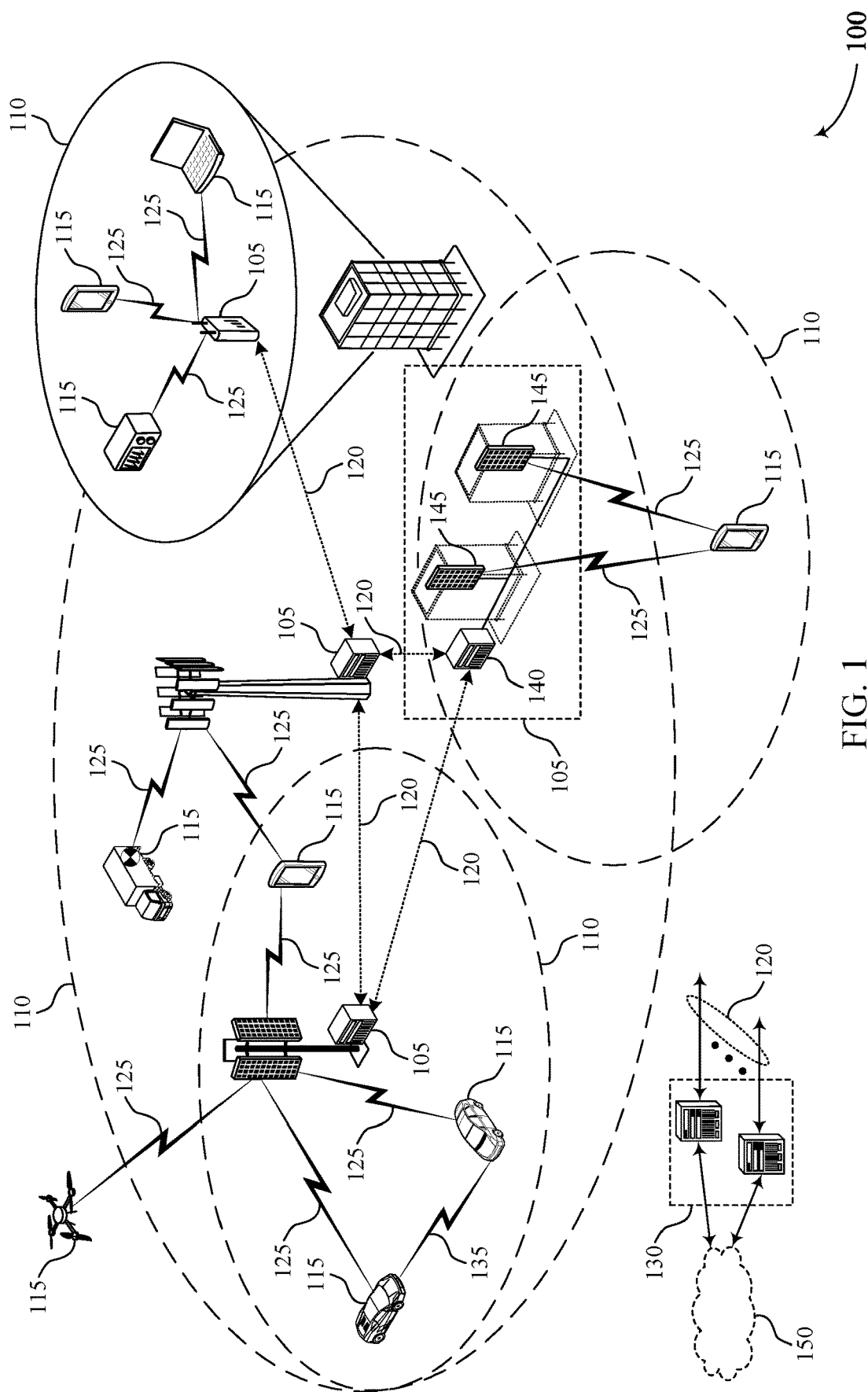
FIG. 1 illustrates an example of a wireless communications system that supports script reuse during inter-frequency or inter-radio access technology (IRAT) measurements and paging in accordance with aspects of the present disclosure.

In some wireless communications systems, a user equipment (UE) may perform search and measurement procedures or other procedures in which the UE may retune from one cell to another. For example, a single subscriber identity module (SIM) UE may maintain an active connection with a source cell (e.g., a serving cell), but may periodically retune its radio frequency (RF) chain to take a measurement on another cell (e.g., a target cell). The measurement may occur during a time gap (e.g., an over-the-air (OTA) gap), and may involve retuning the RF chain to take measurements on different frequencies and different radio access technologies (RATs). In some cases, multi-SIM (MSIM) UEs may retune (e.g., tune-away) from an active subscription in order to take measurements of or participate in paging on an idle subscription. In each of these cases, the UE may conduct the retuning and measurements based on corresponding scripts. The UE may regenerate the scripts for the retuning and measurement activities each time a retuning activity occurs (e.g., at each OTA gap), which may be an inefficient use of time and processor resources at the UE.

Techniques described herein enable a UE to use power efficient inter-frequency or inter-RAT (IRAT) measurement and MSIM quick tuneaway (QTA) so that the UE may reuse scripts instead of regenerating a script each time that a retuning or measurement activity occurs. In some cases, a script may include a set of predetermined instructions for carrying out a task. In some cases, scripts may be parameterized such that the corresponding instructions may be executed for different measurement and paging activities (e.g., the scripts may be dynamic). In some cases, the reuse of scripted instructions may occur based on alignment of current serving cell or target cell configurations with prior serving cell or target cell configurations prevailing when a particular script was initially generated. In some cases, this may enable the UE to refrain from regenerating an entire set of instructions to address configuration differences at a base station.

In some examples, the UE may save scripts and, upon being scheduled to make an inter-frequency or IRAT measurement or participate in an idle subscription paging activity, the UE may determine whether to reuse a saved script. The UE may determine to save a script based on a comparison of the configurations (e.g., the frequency and bandwidths) of both the source cell (e.g., serving cell) of the UE supported by a first RAT or subscription and the target cell supported by a second RAT or subscription at the time of the saved script. If the configurations are the same, the UE may reuse the saved script. In some cases, even if the current configurations of the source cell and the target cell are the same, the UE may lack sufficient memory to run a pre-generated script, and as such, may regenerate a script to use for a measurement or paging activity.

Particular aspects of the subject matter described herein may be implemented to realize one or more advantages. The described techniques may support improvements in power efficient inter-frequency or IRAT measurement and MSIM QTA by allowing the UE to skip the regeneration of scripts, which may save power at the UE. Further, in some examples, the UE may save and reuse scripts for later measurement and paging activities, which may save the UE time and processor resources. As such, supported techniques may include improved network operations, and, in some examples, may promote network efficiencies, among other benefits.

Aspects of the disclosure are initially described in the context of wireless communications systems. Aspects of the disclosure are then illustrated by IRAT procedures, QTA procedures, and Aspects of the disclosure are further illustrated by and described with reference to apparatus diagrams, system diagrams, and flowcharts that relate to script reuse during inter-frequency or IRAT measurements and paging.

FIG. 1 illustrates an example of a wireless communications system 100 that supports script reuse during inter-frequency or IRAT measurements and paging in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (RAT) (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone (SA) mode where initial acquisition and connection may be conducted by the UEs 115 via the carrier, or the carrier may be operated in a non-standalone (NSA) mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of an RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) communications. The UEs 115 may be designed to support ultra-reliable, low-latency, or critical functions. Ultra-reliable communications may include private communication or group communication and may be supported by one or more services. Support may include prioritization of services which may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or RF beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may use power efficient inter-frequency or IRAT measurement and MSIM QTA so that the UE 115 may reuse scripts instead of regenerating a script each time that a retuning or measurement activity occurs. For example, the UE 115 may save scripts and, upon being scheduled to make an inter-frequency or IRAT measurement or participate in an idle subscription paging activity, the UE 115 may determine whether to reuse a saved script. The UE 115 may determine to save a script based on a comparison of the configurations (e.g., the frequency and bandwidths) of both the source cell (e.g., serving cell) of the UE 115 and the target cell at the time of the saved script. If the configurations are the same, the UE 115 may reuse the saved script. In some cases, even if the current configurations of the source cell and the target cell are the same, the UE 115 may lack sufficient memory to run a pre-generated script, and as such, may regenerate a script to use for a measurement or paging activity.

Figure 2:
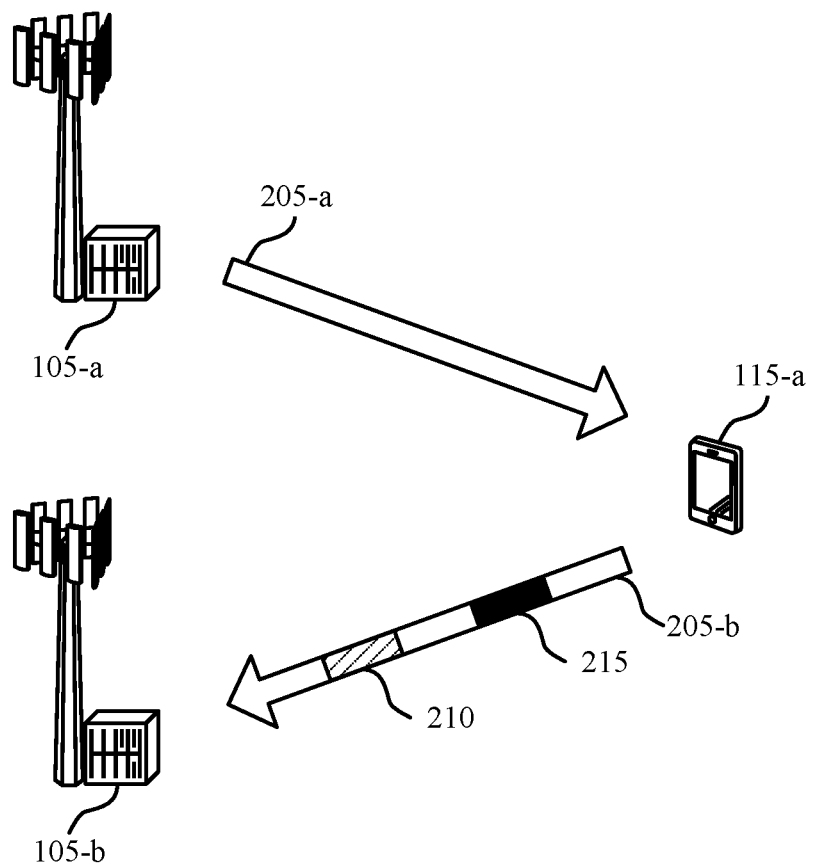
FIG. 2 illustrates an example of a wireless communications system that supports script reuse during inter-frequency or IRAT measurements and paging in accordance with aspects of the present disclosure.

FIG. 2 illustrates an example of a wireless communications system 200 that supports script reuse during inter-frequency or IRAT measurements and paging in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-*a*, a base station 105-*a*, and a base station 105-*b*, which may be examples of corresponding devices described herein with reference to FIG. 1. The wireless communications system 200 may include features for improved communications between the UE 115-*a* and the base station 105, among other benefits.

The UE 115-*a* may communicate with the base stations 105 via the communication links 205. For example, the UE 115-*a* may communicate with the base station 105-*a* via the communications link 205-*a* and with the base station 105-*b* via the communications link 205-*b*. In some cases, the UE 115-*a* may be a single SIM UE and may maintain an active communication with a serving cell supported by the base station 105-*a*. The UE 115-*a* may periodically retune its RF chain to take an active measurement on another cell (e.g., a target cell) supported by the base station 105-*b*. In some cases, the measurement may occur during a time gap (e.g., an OTA time gap), and may involve retuning the RF chain to take measurement on different frequencies and RATs. For example, the UE 115-*a* may take measurements between a local area network (LAN)-to-LAN (L2L) system, a LANto-NR (L2NR) or NR-to-LAN (NR-to-LAN) system, an evolved Universal Mobile Telecommunications (UMTS) Terrestrial Radio Access Network (E-UTRAN) NR dual connectivity (ENDC)-to-LAN system, or an ENDC-to-NR system. The UE 115-*a* may also take measurements in a connected mode discontinuous reception (CDRX) configuration. In some cases, the UE 115-*a* may be an MSIM UE, and may retune (e.g., tune-away) from an active subscription (e.g., supported by the base station 105-*a*) in order to take measurements or participate in paging on an idle subscription (e.g., supported by the base station 105-*b*).

In each of these cases (e.g., the single SIM UE or the MSIM UE), the UE 115-*a* may conduct the retuning and measurement activities based on corresponding scripts (e.g., predetermined sets of instructions), and may regenerate the scripts each time a retuning activity occurs (e.g., at each OTA gap). In some examples, the source technology (e.g., at the source cell, such as L or NR) may rebuild scripts and boost a processor clock (e.g., CLK) to turbo (e.g., TURBO) to speed up a script building timeline for all configuration scenarios, regardless of the source cell and target cell configurations. In some examples, the script building duration may be 12 ms on average with TURBO CLK for L2NR or NR2L full scripts, and with tune-away and tune-back. An OTA gap may occur as often as every 40 ms, and as such, the power cost may be 12 ms every 40 ms with TURBO CLK. The same may occur for idle subscription QTA in connected and idle MSIM configurations. The UE 115-*a* may rebuild the scripts for idle serving cell QTA, and may use data subscription boost CLK to TURBO for idle subscription script building.

To use power efficient inter-frequency or IRAT measurement and MSIM QTA techniques, the UE 115-*a* may reuse scripts instead of regenerating a script each time that a retuning or measurement activity occurs. In some cases, the UE 115-*a* may be a single SIM UE (e.g., may have one subscriber) and may operate in LTE or NR in idle an mode, as LTE only, as NR SA, or in a connected ENDC mode with an OTA gap or with CDRX OFF. The source technology supported by the base station 105-*a* may be LTE, NR, or ENDC (e.g., LTE and NR in a DC mode), and the target cell supported by the base station 105-*b* may be any technology (e.g., LTE, NR, wireless LAN (W), Global System for Mobile Communications (G), and the like).

The UE 115-*a* may track different OTA gaps between source cells and target cells with the same configuration (e.g., the same RAT). In some cases, the UE 115-*a* may use a tracking mechanism to track the memory usage (e.g., based on the buffer size of a script and the number of tuned receptions and transmissions on the source side), and may retune the script from the previous OTA gaps and the target frequency for the current gap to decide whether to reuse the scripts from the previous gaps or if the scripts may benefit from being rebuilt. The UE 115-*a* may also track a number of prebuilt scrips to ensure that the scripts will not exceed existing, available memory at the UE 115-*a*. In ENDC, the UE 115-*a* may use a common entity between LTE and NR to track both source technologies (e.g., LTE and NR). If there is any reconfiguration on either side, then the UE may rebuild the scripts for the IRAT ENDC2L, ENDC2NR, and ENDC2X cases.

In some cases, if the UE 115-*a* is performing LTE and NR ML1 measurements, RF measurements, or both, such as reference signal received power (RSRP), received signal received quality (RSRQ), received signal strength indicator (RSSI), and signal interference-to-noise ratio (SINR) measurements, the UE 115-*a* may keep any prebuilt scripts. The UE 115-*a* may use the tracking mechanism to determine if there is any configuration change in the source frequency, target frequency, source bandwidth, and target bandwidth, and if there is enough memory to allocate the changes in configuration. The UE 115-*a* may use the prebuilt scripts for different gap cycles that may save script building time, may refrain from using a CLK boost, and may allow sleep kick in during the saved script building time before a gap. In some cases, significant power savings may be measured using the techniques described herein, and specifically, the UE 115-*a* may leverage the described framework to save power in CDRXC OFF measurement and idle search and measurement.

In some examples, the UE 115-*a* may operate according to a connected subscription or an idle subscription. In some cases, the connected subscription (e.g., sub1) may operate according to LTE, NR, or ENDC, and the idle subscription (e.g., sub2) may operate according to LTE or NR. The UE 115-*a* may use a QTA procedure for paging from the connected subscription (e.g., supported by the base station 105-*a*) to the idle subscription (e.g., supported by the base station 105-*b*), a neighbor cell search and measurement, or both, and may tune back from the idle subscription after the paging or measurement activity is done. In some cases, the UE 115-*a* may use a common entity between the connected subscription and the idle subscription (e.g., between sub1 and sub2) to decide a cross subscription and whether the UE 115-*a* may rebuild the QTA and tune-back scripts from idle wake cycles. In some cases, the UE 115-*a* may use the common entity to determine that idle paging may occur on the same frequency as on the serving cell (e.g., the source cell), and that the idle measurement may occur on the same frequency as the neighbor cell. The UE 115-*a* may also determine that the connected subscription may lack reconfiguration in between different wakeup cycles.

As described herein, the UE 115-*a* may reuse scripts instead of regenerating a script each time that a retuning or measurement activity occurs. For example, the UE 115-*a* may save scripts and, upon being scheduled to make an inter-frequency or IRAT measurement 210 or participate in an idle subscription paging activity 215, the UE 115-*a* may determine whether to reuse a saved script. The UE 115-*a* may determine to save a script based on a comparison of the configurations (e.g., the frequency and bandwidths) of both the source cell supported by the base station 105-*a* and the target cell supported by the base station 105-*b* at the time of the saved script. If the configurations are the same, the UE 115-*a* may reuse the saved script. In some cases, even if the current configurations of the source cell and the target cell are the same, the UE 115-*a* may lack sufficient memory to run a pre-generated script, and as such, may regenerate a script to use for a measurement 210 or a paging activity 215.

The UE 115-*a* may identify that the UE 115-*a* is scheduled to perform the measurement 210 or the paging activity 215 associated with the target cell supported by the base station 105-*b*. The base station 105-*b* may operate according to a target cell configuration different from the serving cell configuration supported by the base station 105-*a*. The UE 115-*a* may determine that it has performed a previous measurement or paging activity associated with the base station 105-*b* while the base station 105-*b* was operating according to a previous target cell configuration and the base station 105-*a* was operating according to a previous serving cell configuration. To determine whether to use a prebuilt script, a reused script, or a newly build script, the UE 115-*a* may compare at least one of the first and previous target cell configurations or the first and previous serving cell configurations. For example, the UE 115-*a* may determine that the configurations include the same RAT or different RATs. In some cases, the UE 115-*a* may detect similarities or some alignment between the different target and serving cell configurations. In some examples, the UE 115-*a* may detect some condition for reuse of a prior script. Based on the comparison, the UE 115-*a* may perform the measurement 210 or the paging activity 215 with the base station 105-*b* using an appropriate script.

Figure 3:
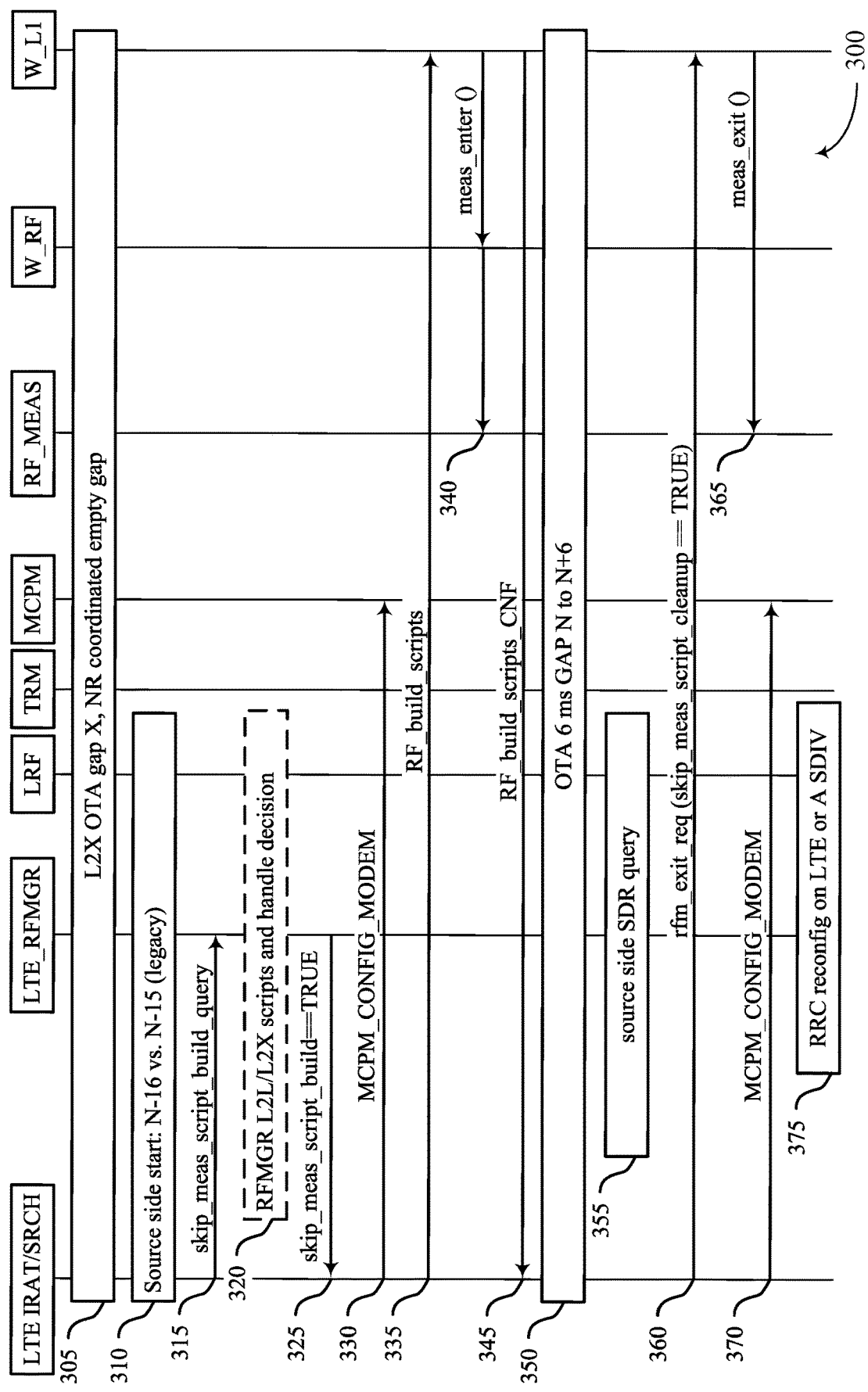
FIG. 3 illustrates an example of an IRAT procedure that supports script reuse during inter-frequency or IRAT measurements and paging in accordance with aspects of the present disclosure.

FIG. 3 illustrates an example of an IRAT procedure 300 that supports script reuse during inter-frequency or IRAT measurements and paging in accordance with aspects of the present disclosure. In some examples, the IRAT procedure 300 may implement aspects of the wireless communications systems 100 and 200 or may be implemented by aspects of the wireless communications systems 100 and 200. For example, the IRAT procedure 300 may be implemented by a UE 115, which may be an example of a corresponding device as described herein with reference to FIGS. 1 and 2. The IRAT procedure 300 may include features for improved communications for the UE 115, among other benefits.

A UE may use power efficient inter-frequency or IRAT measurement techniques so that the UE may reuse scripts (e.g., predetermined sets of instructions) instead of regenerating a script each time that a retuning or measurement activity occurs. For example, a single SIM UE may maintain an active connection with a serving cell, but may periodically retune its RF chain to take a measurement on another cell (e.g., a target cell). The measurement may occur during a time gap (e.g., an OTA gap), and may involve retuning the RF chain to take measurements on different frequencies and different RATs. For example, the UE may save scripts and, upon being scheduled to make an inter-frequency or IRAT measurement or participate in an idle subscription paging activity, the UE may determine whether to reuse a saved script. The UE may determine to save a script based on a comparison of the configurations (e.g., the frequency and bandwidths) of both the source cell (e.g., serving cell) of the UE and the target cell at the time of the saved script. If the configurations are the same, the UE may reuse the saved script. In some cases, even if the current configurations of the source cell and the target cell are the same, the UE may lack sufficient memory to run a pre-generated script, and as such, may regenerate a script to use for a measurement or paging activity. As described with reference to FIG. 3, the UE may use an NSA synchronized IRAT procedure to perform a measurement on a target cell while being supported by a source cell.

The UE may be configured to perform a measurement between a source cell with a corresponding source RAT of LTE IRAT/search (LTE IRAT/SRCH) and a target cell (e.g., W, Layer 1 (W_L1)). The source cell and the target cell may correspond to LTE, NR, ENDC, or another RAT. In some cases, the source cell RAT may be LTE, which may include an LTE IRAT/SRCH component, an LTE RF manager (LTE_RFMGR), and a location retrieval function (LRF). The NSA synchronized IRAT procedure may also include a transmit receive module (TRM), a clock and power manager (MCPM), and an RF measurement (RF_MEAS) component. Within the NR 5G RAT, the procedure may include a number of receive RF chains (NRRF) and the NR_L1 and W_RF layers. In the example of FIG. 3, an OTA gap between LTE and NR may coordinated such that the LTE and NR supported cells experience the gap begin and end at the same time, and therefore the procedure is synchronized.

In some cases, the UE 115-*a* may operate in an LTE-to-W environment with LTE supporting the source cell and NR supporting the target cell. At 305, the UE may identify an OTA gap between the source cell and the target cell (e.g., L2X OTA gap X, NR coordinated empty gap, where X represents the target cell RAT). At 310 between the LTE IRAT/SRCH component and the TRM, the UE may detect the OTA gap and begin the measurement procedure on the source side. For example, the environment may begin with a source side start (e.g., following subframe N-16 vs. subframe N-15). The UE may set the client state and start the IRAT procedure (e.g., set_client_state, IRAT Start) between the LTE IRAT/SRCH component and the LTE_RFMGR, and between the LTE_RFMGR and the TRM. At the TRM, the UE may gather information about the target device to use in the IRAT procedure. In some cases, the UE may receive information back from the TRM to the LTE_RFMGR about the set client state, including a target cell grant (e.g., set_client_state, tgt grant). The UE may initiate a software-defined radio (SDR) query to gather more information about the target cell and the associated RAT.

In some examples, the UE may receive return information from the LTE_RFMGR to the LTE IRAT/SRCH component regarding the target device including the TRM grant and SDR RF chain information from the MCPM (e.g., set_client_state, TRM Grant, mcpm_rf_sdr_info). At 315, the UE may transmit a query to skip rebuilding the measurement script for measuring the target cell based on the target cell frequency (e.g., skip_meas_script_build_query (target frequency)). As such, the UE may save memory by refraining from rebuilding a script. At 320, the UE may use a tracking mechanism to track the memory usage at the UE (e.g., based on the buffer size of a script and the number of tuned receptions and transmissions on the source side), and may retune the script from the previous OTA gaps and the target frequency for the current gap to decide whether to reuse the scripts from the previous gaps or if the scripts may benefit from being rebuilt. For example, the UE may use the RFMGR L2L and the L2X scripts and determine what scripts to use for retuning. The tracking mechanism is described in more detail with respect to FIG. 4A.

At 325, the UE may skip rebuilding the script, and instead reuse a prebuilt script, based on having the same target frequency and not retuning from the previous gap (e.g., skip_meas_script_build==TRUE). At 330, between the LTE IRAT/SRCH component and the MCPM, the UE may boost up its clock if the UE rebuilt the script to ensure that the retuning and measurement activities occur correctly when the target frequency is busy (e.g., MCPM_CONFIG_MODEM (mcpm_rf_sdr_info only, no clock bumpup). If the UE reused a prebuilt script, the UE may refrain from boosting up its clock. At 335, the UE may rebuild RF scripts during a gap between the LTE IRAT/SRCH and the W_L1 RAT (e.g., RF_build_scripts (src_1 LTE, src_2 INVALID, tgt_TECH, skip_meas_script_build TRUE)). The UE may skip script building if the target frequency is the same and the UE refrains from retuning. At 340, the UE may perform a measurement (e.g., enter the measurement environment) on the target cell using the RF_MEAS component (e.g., Meas_enter( )). In some cases, the UE may be in a regular gap environment and may continue the measurement activity using the prebuilt script or a new rebuilt script (e.g., Tech_X_RF_build_scripts_req(meas_common_config)). At 345, the UE may receive a confirmation (CNF) from the target cell (e.g., W_L1) that the UE used a script to perform a measurement on the target cell (e.g., RF_build_scripts_CNF). The UE may determine that it is entering a gap environment within the next 3 subframes (e.g., pre gap: subframe N-3). At 350, the UE may determine that the OTA gap is a 6 ms gap from subframe N to subframe N+6 (e.g., OTA 6 ms GAP N to N+6), and at the end of the gap, the UE may trigger the ending of the IRAT procedure (e.g., set_client_state IRAT end).

At 355 after the gap, the UE may perform a source side SDR query to gather information about the target cell after the measurement activity. The UE may use the information to end the IRAT procedure (e.g., set_client_state IRAT_end (mcmp_rf_sdr_info)). At 360, the UE may cleanup the script the UE used to perform the measurement on the target cell (e.g., rfm_exit_req(skip_meas_script_cleanup=TRUE)). In some cases, the UE may also inform the source cell (e.g., the LTE IRAT/SRCH component) and the target cell (e.g., W_L1) that the gap is over. At 365, the target cell may signal to RF_MEAS component that the measurement activity at W_L1 is complete (e.g., meas_exit( )), In some cases, the UE may signal a confirmation that the measurement is complete (e.g., meas_exit_cnf( )). The target cell may signal to the source cell that the measurement is complete (e.g., meas_exit_done_cb( )). At 370, between the LTE IRAT/ SRCH component and the MCPM, the UE may refrain from reducing its clock speed to continue power savings until the next gap (e.g., MCPM_CONFIG_MODEM (mcpm_rf_sdr_info, no clock bump down)). At 375, the UE may perform an RRC reconfiguration on LTE or for antenna switch diversity (ASDIV). The RRC reconfiguration and the script cleanup procedure are described in more detail with respect to FIG. 4B.

Figure 4A:
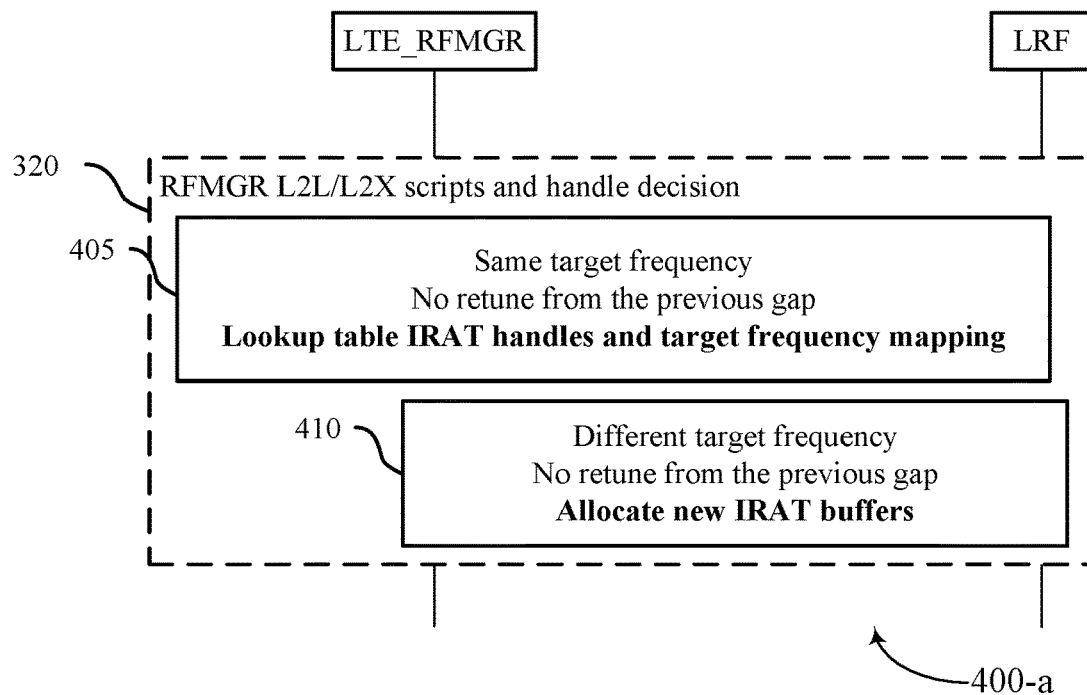
FIGS. 4A and 4B illustrate examples of an IRAT procedure that supports script reuse during inter-frequency or IRAT measurements and paging in accordance with aspects of the present disclosure.

FIG. 4A illustrates an example of an IRAT procedure 400-a that supports script reuse during inter-frequency or IRAT measurements and paging in accordance with aspects of the present disclosure. In some examples, the IRAT procedure 400-a may implement aspects of the wireless communications systems 100 and 200 or may be implemented by aspects of the wireless communications systems 100 and 200. For example, the IRAT procedure 400-a may be implemented by a UE 115, which may be an example of a corresponding device as described herein with reference to FIGS. 1 and 2. The IRAT procedure 400-a may include features for improved communications for the UE 115, among other benefits.

As described with reference to FIG. 3, the UE may use power efficient inter-frequency or IRAT measurement techniques so that the UE may reuse scripts instead of regenerating a script each time that a retuning or measurement activity occurs. A single SIM UE may use an NSA synchronized IRAT procedure to perform a measurement on a target cell while being supported by a source cell. The IRAT procedure 400-a describes a portion of the IRAT procedure 300, as described with reference to FIG. 3, in more detail.

At 320, between the LTE IRAT/SRCH component and the MCPM, the UE may use a tracking mechanism to track the memory usage at the UE (e.g., based on the buffer size of a script and the number of tuned receptions and transmissions on the source side), and may retune the script from the previous OTA gaps and the target frequency for the current gap to decide to reuse the scripts from the previous gaps or if the scripts may benefit from being rebuilt. For example, the UE may use the RFMGR L2L and the L2X scripts and decide what scripts to use for retuning.

At 405, the UE may determine that the source cell has the same frequency as the target cell (e.g., same target frequency), and may determine to refrain from retuning from a previous OTA gap (e.g., no retune from the previous gap). The UE may use a lookup table to map the target frequency (e.g., lookup table IRAT handles and target frequency mapping). That is, for this given gap, the source cell may operate at the same frequency as the target cell, the UE may use a lookup table to determine whether the UE may use a prebuilt script (e.g., based on the same frequency). As such, the criteria for reusing a previous script may depend on having the same target frequency and refraining from retuning, in addition to communicating with the same devices (e.g., which may be indicated by the TRM) and having sufficient memory at the UE. Additionally or alternatively, at 410, the UE may determine that the source cell has a different frequency than the target cell, and may refrain from retuning from the previous gap. Thus, the UE may allocate new IRAT buffers and rebuild a script.

Figure 4B:
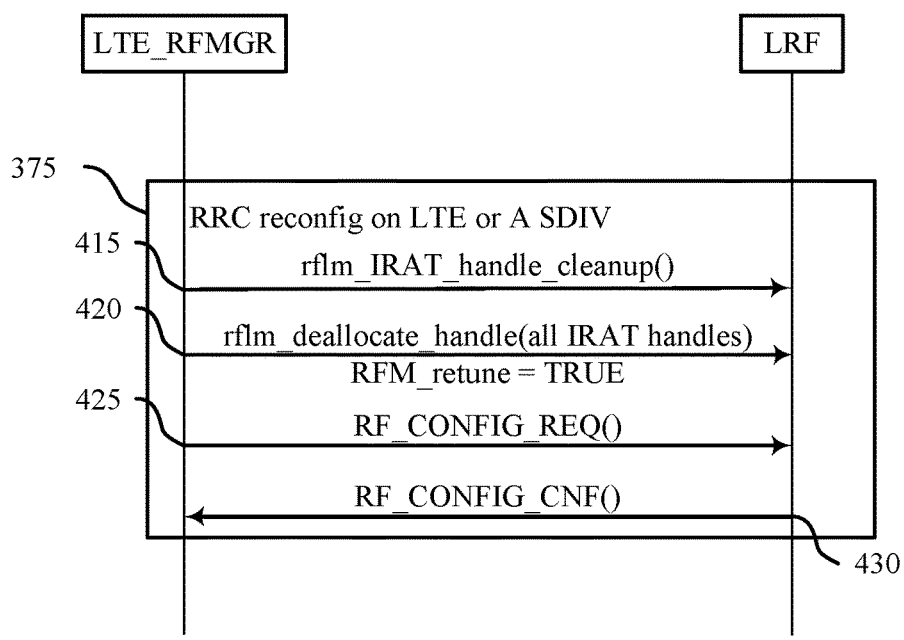

FIG. 4B illustrates an example of an IRAT procedure 400-b that supports script reuse during inter-frequency or IRAT measurements and paging in accordance with aspects of the present disclosure. In some examples, the IRAT procedure 400-b may implement aspects of the wireless communications systems 100 and 200 or may be implemented by aspects of the wireless communications systems 100 and 200. For example, the IRAT procedure 400-b may be implemented by a UE 115, which may be an example of a corresponding device as described herein with reference to FIGS. 1 and 2. The IRAT procedure 400-b may include features for improved communications for the UE 115, among other benefits.

As described with reference to FIG. 3, the UE may use power efficient inter-frequency or IRAT measurement techniques so that the UE may reuse scripts instead of regenerating a script each time that a retuning or measurement activity occurs. A single SIM UE may use an NSA synchronized IRAT procedure to perform a measurement on a target cell while being supported by a source cell. The IRAT procedure 400-b describes a portion of the IRAT procedure 300, as described with reference to FIG. 3, in more detail.

After confirming the gap measurement procedure is complete, at 375, the UE may perform an RRC reconfiguration on LTE or for ASDIV. In some cases, a network (e.g., a base station) or the UE may trigger the reconfiguration. At 415, between the LTE_RFMGR and the LRF, the UE may allocate resources to handle cleanup of the script (e.g., rflm_IRAT_handle_cleanup( )). At 420, the UE may perform a retuning activity based on the reconfiguration at 375 (e.g., rflm_deallocate_handle(all IRAT handles) RFM_Retune=TRUE). During the reconfiguration, the UE may store the original configuration in some memory of the UE and the new configuration in some other memory of the UE. Once the reconfiguration is complete, the UE may release the memory containing the original configuration for other uses. However, to prevent the use of excess memory, the UE may use the cleanup procedures to remove any scripts that the UE may no longer use, thus increasing the available memory at the UE for the reconfiguration. In some examples, at 425, the UE may initiate a reconfiguration retune request to the LRF (e.g., RF_CONFIG_REQ( )), and at 430, the LRF may confirm the RF reconfiguration (e.g., RF_CONFIG_CNF( )). By following the cleanup procedures, the UE may ensure that the reconfiguration procedures refrain from exceeding the available memory.

Figure 5:
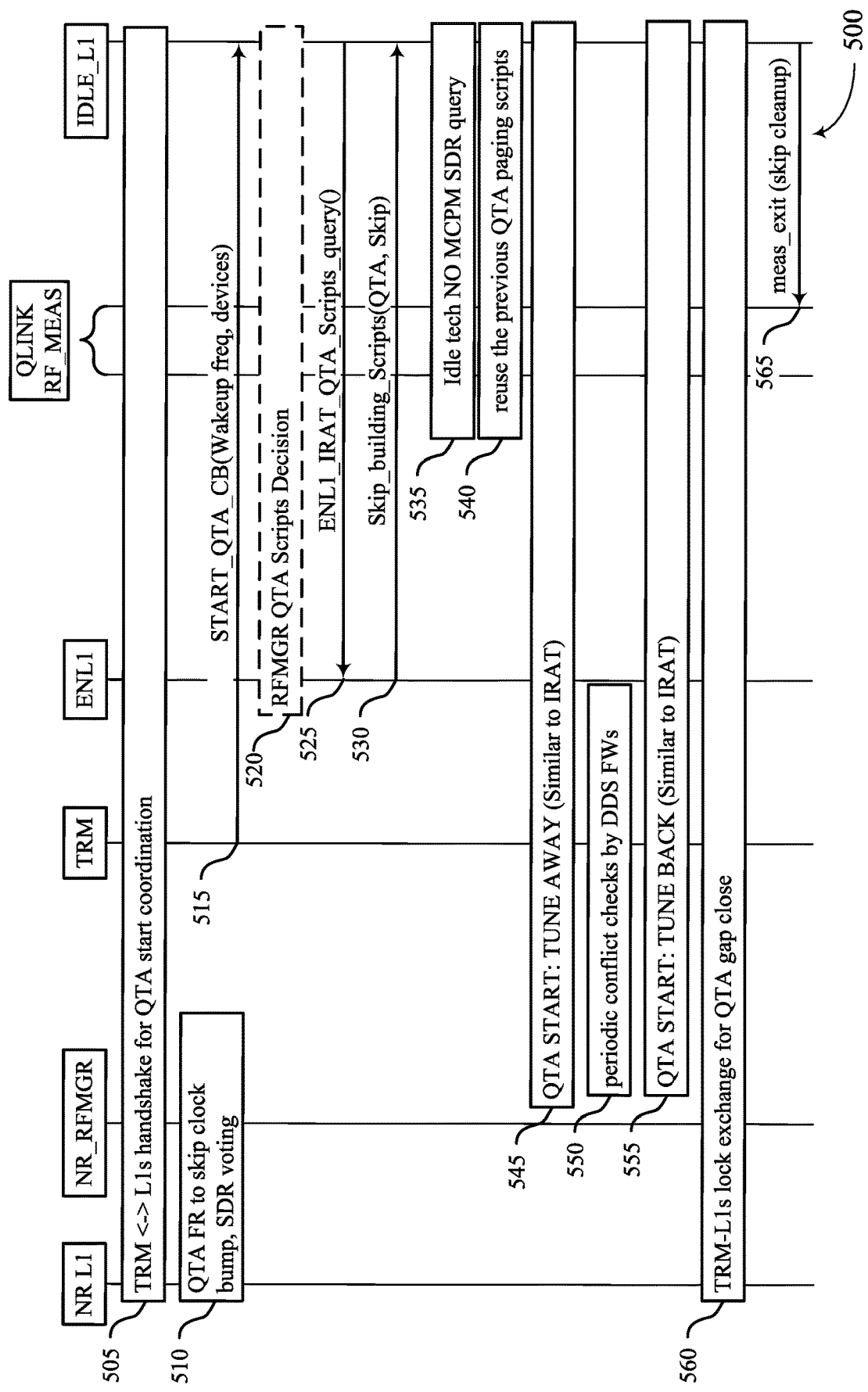
FIG. 5 illustrates an example of a quick tuneaway (QTA) procedure that supports script reuse during inter-frequency or IRAT measurements and paging in accordance with aspects of the present disclosure.

FIG. 5 illustrates an example of a QTA procedure 500 that supports script reuse during inter-frequency or IRAT measurements and paging in accordance with aspects of the present disclosure. In some examples, the QTA procedure 500 may implement aspects of the wireless communications systems 100 and 200 or may be implemented by aspects of the wireless communications systems 100 and 200. For example, the QTA procedure 500 may be implemented by a UE 115, which may be an example of a corresponding device as described herein with reference to FIGS. 1 and 2. The QTA procedure 500 may include features for improved communications for the UE 115, among other benefits.

A UE may use power efficient inter-frequency or IRAT MSIM QTA so that the UE may reuse scripts (e.g., predetermined sets of instructions) instead of regenerating a script each time that a retuning or measurement activity occurs. In some cases, MSIM UEs may retune (e.g., tune-away) from an active subscription in order to take measurements or participate in paging on an idle subscription. In some cases, the UE may save scripts and, upon being scheduled to make an inter-frequency or IRAT measurement or participate in an idle subscription paging activity, the UE may determine whether to reuse a saved script. The UE may determine to save a script based on a comparison of the configurations (e.g., the frequency and bandwidths) of both the source cell (e.g., serving cell) of the UE and the target cell at the time of the saved script. If the configurations are the same, the UE may reuse the saved script. In the QTA procedure 500, for example, the connected subscription (e.g., sub1) may operate according to NR, and the idle subscription (e.g., sub2) may operate according to LTE.

The UE may be configured to perform a QTA procedure 500, such as NR++L QTA, between a connected subscription (e.g., NR L1) and an idle subscription (e.g., IDLE_L1). The connected and idle subscriptions may correspond to LTE, NR, ENDC, or another RAT. In some cases, the QTA procedure 500 may include different components such as NR_L1, an NR RF manager (NR_RFMGR), an NR firmware (NFW) component, a network repository function (NRF), a TRM, a coexistence manager (CXM), an enhanced L1 (ENL1) entity (e.g., a common entity between the connected and idle subscriptions), an MCPM, a QLINK, an RF_MEAS component, an IDLE_RF component, and IDLE firmware (IDLE_FW). The QTA procedure 500 for MSIM UEs follows similar procedures as the IRAT procedure 300 for single SIM UEs described with reference to FIG. 3. In some cases, the UE may track the source side (e.g., the connected subscription). Depending on whether there is any reconfiguration between different idle subscriptions during wakeup cycles (e.g., if the idle subscription uses different serving cells, different bandwidths) and whether there is enough memory at the UE, the UE may determine to reuse a prebuilt script or rebuild a script to perform MSIM QTA.

In some cases, the UE may establish a connection between the NR_RFMGR and the ENL1 to update tuned devices used in the QTA procedure 500, where ENL1 may be the common entity between the connected and idle subscriptions (e.g., ENL1_Tuned_Devices_update(LTE Sub1, 4CC devices)). In some cases, the ENL1 may track whether the connected subscription performs any reconfigurations in between the wakeup cycles of the idle subscription. At 505, the UE may perform a 2-way handshake between the TRM and the L1s (e.g., the IDLE_L1) to start coordination for QTA (e.g., TRM<->L1s handshake for QTA start coordination). The UE may receive an request at the ENL1 from the IDLE_L1 when the device at the IDLE_L1 is in a sleep mode (e.g., proc_req(Sub2 sleep)), and the UE may transmit back a signal from the ENL1 to the IDLE_L1 (e.g., enl1_proc_cb(sleep, proc). The UE may receive a TRM reservation at the TRM from the IDLE_L1, which may include the IDLE_L1 reserving the TRM for paging activities between the connected subscription and the idle subscription.

In some examples, the UE may use the TRM to signal to unlock the QTA procedure (e.g., unlock IND QTA) and start the process of unlocking the QTA (e.g., Unlock processing QTA_obj start). The UE may receive an indication from the TRM to proceed with the QTA procedure (e.g., QTA proceed TRUE), and may set the client state to begin the QTA procedure between the NR L1 and the TRM (e.g., LTE_L1->TRM: set_client_state (QTA Start)). The UE may receive a grant from the TRM to perform the QTA (e.g., set_client_state (QTA grant)).

At 510, the UE may determine to skip a clock bump (e.g., refrain from speeding up the clock) and may initiate SDR voting (e.g., QTA FR to skip clock bump, SDR voting). At 515, the UE may start the QTA procedure at the TRM and wakeup the idle device at IDLE_L1 to participate with the NR_L1 (e.g., START_QTA_CB(Wakeup freq, devices)). At 520, the UE may begin determining whether to reuse a prebuilt script or to rebuild a new script (e.g., RFMGR QTA Scripts Decision), which is described in more detail with reference to FIG. 6. At 525, the UE may receive a query from the IDLE_L1 about whether the UE will use a prebuilt script or a rebuilt script (e.g., ENL1_IRAT_QTA_Scripts_query( )). At 530, the UE may transmit an indication to the IDLE_L1 from the ENL1 to skip script building and instead, reuse prebuilt scripts (e.g., Skip_building_Scripts(QTA, Skip)). At 535, the UE may refrain from transmitting an MCPM SDR query (e.g., Idle tech NO MCPM SDR query) as the UE is refraining from rebuilding a script. At 540, the UE may determine to reuse the previous QTA paging scripts for paging activities with the idle subscription.

In some cases, the UE may perform periodic conflict checks between the NR L1 and the CXM (e.g., double data rate synchronous dynamic random access memory (SDRAM) (DDS) firmware (FW) periodic conflict check). For example, the UE may initiate a conflict check start from the NR L1 to the NFW component and may perform the conflict check between the NFW component and the CXM and determine that the signal lacks conflicts. In some examples, the UE may perform a lock exchange between L1 and the TRM. During the lock exchange, the UE may transmit a request from the NR L1 to the TRM (e.g., Multi_request RnN CFG-ID: Y), the IDLE_L1 may transmit a TRM request to the TRM, and the UE may use the TRM to transmit a TRM grant to the IDLE_L1.

At 545, the UE may start the tuneaway procedure, which may be similar to the IRAT process described with reference to FIGS. 3, 4A, and 4B (e.g., QTA START: TUNE AWAY (similar to IRAT)). The QTA procedure may begin with device supported by the idle subscription waking up from a sleep or idle mode (e.g., LL1_wakeup_FW_Req Start CxM reservation). The UE may perform a conflict check between the NFW component and the CXM, and may yield further signaling if a conflict is detected ahead. Upon detecting a conflict, the UE may blank the start and de-configure its RF chains (e.g., Blanking start RF chains de-config) to prevent interference. The UE may then tune-away from the IDLE_FW to the RF_MEAS component based on detecting a conflict (e.g., TUNE AWAY RF FED API).

At 550, the UE may perform more periodic conflict checks using DDS FWs. The UE may perform a conflict check between the NFW component and the CXM and may yield if the UE detects a conflict ahead. The UE may perform a paging activity with the IDLE_L1 (e.g., Page Decode/IDLE Meas), and at 555, the UE may start the tune-back procedure, which may be similar to the IRAT process described with reference to FIGS. 3, 4A, and 4B (e.g., QTA START: TUNE BACK (similar to IRAT)). In some cases, the device at the IDLE_L1 may stop the CXM reservation and go into a sleep or idle mode (e.g., LL1_Sleep_FW_req Stop CxM reservation). The UE may perform a conflict check between the NFW component and the CXM and may proceed even if a conflict is detected ahead using a tune-back procedure. The UE may tune-back from the NFW component to the RF_MEAS component (e.g., TUNE BACK RF FED API).

At 560, the UE may perform a lock exchange between TRM and the L1s. During the lock exchange, the IDLE_L1 may transmit a TRM reservation to the TRM. The TRM may grant a codebook (CB) to the NR L1, and the TRM may wait for the LTW to proceed. In some cases, the UE may end the QTA procedure (e.g., set_client_state QTA End) upon which the QTA procedure may become asynchronized (e.g., TRM_Async_cb_(QTA_end)). At 565, the UE may complete the paging activities with the idle subscription and may skip cleaning up the script (e.g., meas_exit(skip cleanup)) to open up memory at the UE for other uses. The UE may end the IRAT procedure at the IDLE_L1 (e.g., rfm_get_mcpm_resources (IRAT END)), which may include path aggregation (e.g., per RFM_path aggregation). In some cases, the UE may approach the end of the QTA procedure 500 and may transmit SDR information between the IDLE_FW and the IDLE_L1 (e.g., mcpm_rf_sdr_info (QLK_1, SDR_1)). The UE may configure a modem between IDLE_L1 and the MCPM (e.g., MCPM_CONFIG_MODEM (mcpm_rf_sdr_info)), and may communicate SDR information between the MCPM and the QLINK (e.g., SDR_1 ON=>LPM, QLK_1 ON=>HIB).

Figure 6:
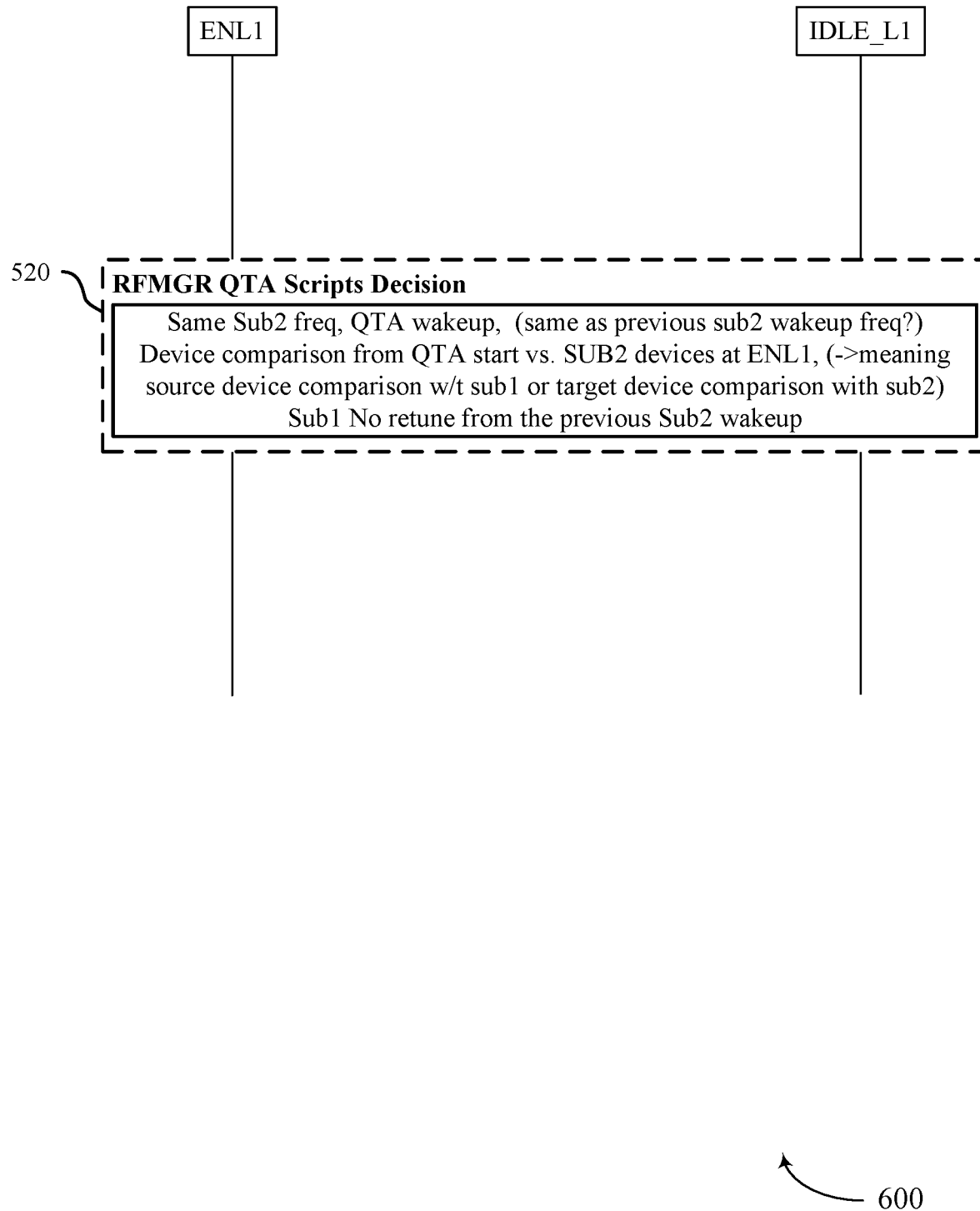
FIG. 6 illustrates an example of a QTA procedure that supports script reuse during inter-frequency or IRAT measurements and paging in accordance with aspects of the present disclosure.

FIG. 6 illustrates an example of a QTA procedure 600 that supports script reuse during inter-frequency or IRAT measurements and paging in accordance with aspects of the present disclosure. In some examples, the QTA procedure 600 may implement aspects of the wireless communications systems 100 and 200 or may be implemented by aspects of the wireless communications systems 100 and 200. For example, the QTA procedure 600 may be implemented by a UE 115, which may be an example of a corresponding device as described herein with reference to FIGS. 1 and 2. The QTA procedure 600 may include features for improved communications for the UE 115, among other benefits.

As described with reference to FIG. 5, the UE may use power efficient inter-frequency or IRAT measurement techniques so that the UE may reuse scripts instead of regenerating a script each time that a retuning or paging activity occurs. An MSIM UE may use a QTA procedure to perform a paging activity with an idle subscription while being supported by a connected subscription. The QTA procedure 600 describes a portion of the QTA procedure 500, as described with reference to FIG. 5, in more detail.

At 520, the UE may decide whether to reuse a prebuilt script or to rebuild a new script (e.g., RFMGR QTA Scripts Decision). In some cases, the UE may determine that connected subscription supporting the UE operates at the same frequency as the idle subscription (e.g., Same Sub2 freq). The UE may initiate a QTA wakeup to bring the device in the idle subscription into a connected mode, which may occur at the same idle subscription wakeup frequency. The UE may then compare the device from the start of the QTA procedure to the devices supported by the idle subscription at the ENL1 (e.g., device comparison from QTA start vs. SUB2 devices at ENL1), in which case the UE may compare a source device without the connected subscription or a target device with the idle subscription. In some cases, the UE may detect a configuration change (e.g., a delta) between the subscriptions or parameters that may enable the UE to reuse the prebuilt script. The UE may determine to refrain from retuning the connected subscription (e.g., sub1) from the previous idle subscription (e.g., sub2) wakeup (e.g., Sub1 No retune from the previous Sub2 wakeup). As such, as connected subscription may have the same frequency as the idle subscription, because the UE refrains from retuning, and if there is enough memory at the UE, the UE may reuse a prebuilt script following the steps described with reference to FIG. 5.

Figure 7:
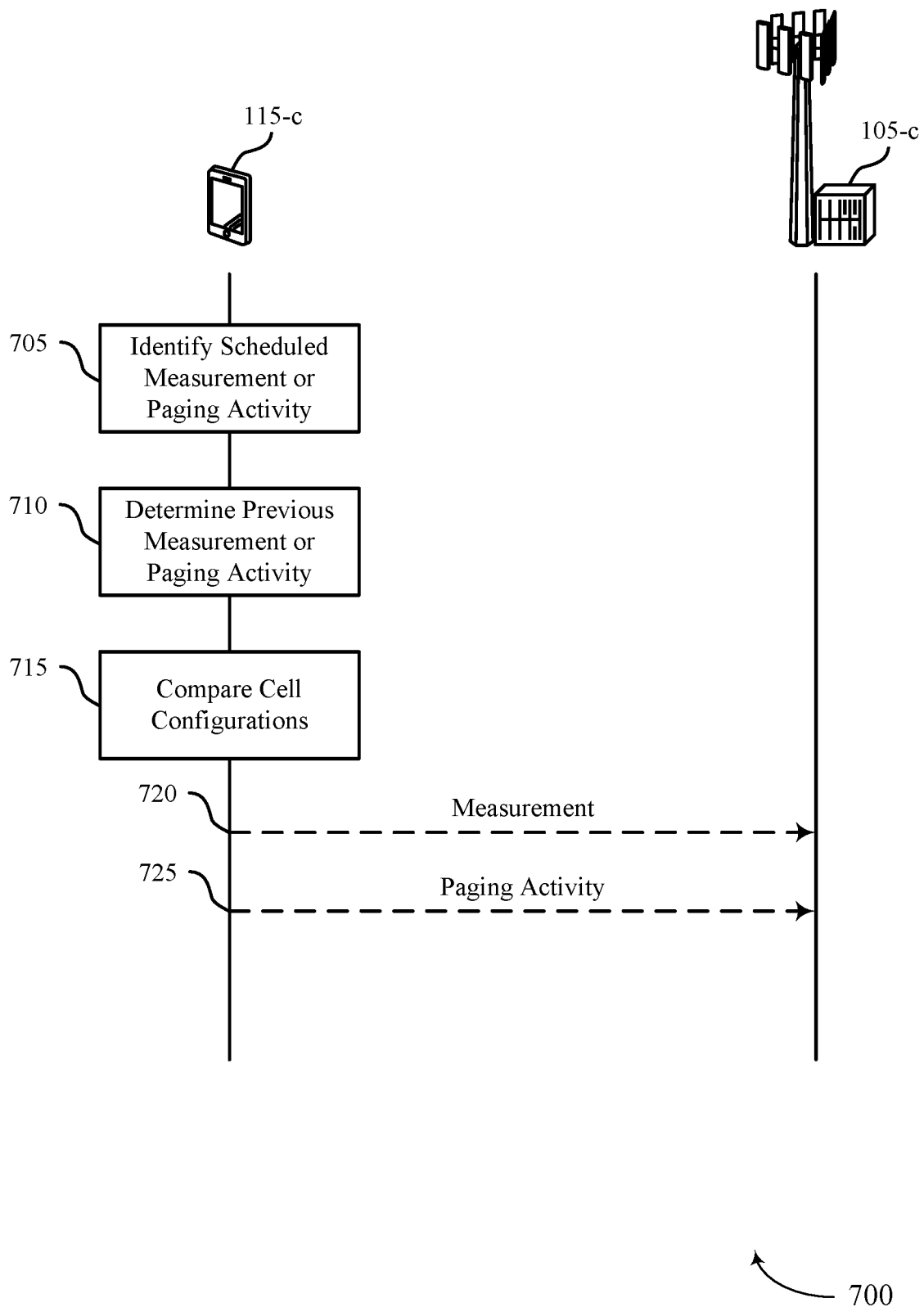
FIG. 7 illustrates an example of a process flow that supports script reuse during inter-frequency or IRAT measurements and paging in accordance with aspects of the present disclosure.

FIG. 7 illustrates an example of a process flow 700 that supports script reuse during inter-frequency or IRAT measurements and paging in accordance with aspects of the present disclosure. The process flow 700 may implement aspects of wireless communications systems 100 and 200, or may be implemented by aspects of the wireless communications system 100 and 200. For example, the process flow 700 may illustrate operations between a UE 115-*c* and a base station 105-*c*, which may be examples of corresponding devices described with reference to FIGS. 1 and 2. In the following description of the process flow 700, the operations between the UE 115-*c* and the base station 105-*c* may be transmitted in a different order than the example order shown, or the operations performed by the UE 115-*c* and the base station 105-*c* may be performed in different orders or at different times. Some operations may also be omitted from the process flow 700, and other operations may be added to the process flow 700.

At 705, the UE 115-*c* may identify that the UE 115-*c* is scheduled to perform a first measurement or paging activity associated with a target cell that is different from a serving cell of the UE. In some cases, the target cell may operate in accordance with a first target cell configuration (e.g., a frequency, a bandwidth, a RAT) and the serving cell may operate in accordance with a first serving cell configuration. For example, the UE 115-*c* may be a single SIM UE and may maintain and active connection with a serving cell (e.g., which may operate according to LTE, NR, or a different RAT), and may periodically retune its RF chain to take a measurement on a target cell (e.g., which may operate according to LTE, NR, or a different RAT). In some cases, the UE 115-*c* may be an MSIM UE and may retune (e.g., tune-away) from an active subscription in order to take measurements or participate in paging on an idle subscription, the active and idle subscriptions operating according to the same or different RATs.

At 710, the UE 115-*c* may determine that the UE 115-*c* has performed a previous measurement or paging activity associated with the target cell while the UE 115-*c* was served by the serving cell. In some cases, the UE 115-*c* may have performed the previous measurement or paging activity while the target cell was operating in accordance with a previous target cell configuration (e.g., a previous RAT) and while the serving cell was operating in accordance with a previous serving cell configuration (e.g., a previous RAT).

At 715, the UE 115-*c* may compare at least one of the first target cell configuration with the previous target cell configuration or the first serving cell configuration with the previous serving cell configuration. For example, the UE 115-*c* or a network (e.g., the base station 105-*a*) may reconfigure the serving cell after an OTA gap. In some cases, the UE 115-*c* may compare the frequencies and bandwidths of the configurations. For example, the UE 115-*c* may detect similarities in the frequencies and bandwidths of the configurations.

At 720, the UE 115-*c* may perform the first measurement using a script, where the source of the script is based on the comparing. At 725, the UE 115-*c* may perform the first paging activity using the script, where the source of the script is based on the comparing. For example, if the serving cell and the target cell operate on the same frequency, and if the UE 115-*c* refrains from retuning, then the UE 115-*c* may reuse a prebuilt script instead of rebuilding a new script each time there is an OTA gap.

Figure 8:
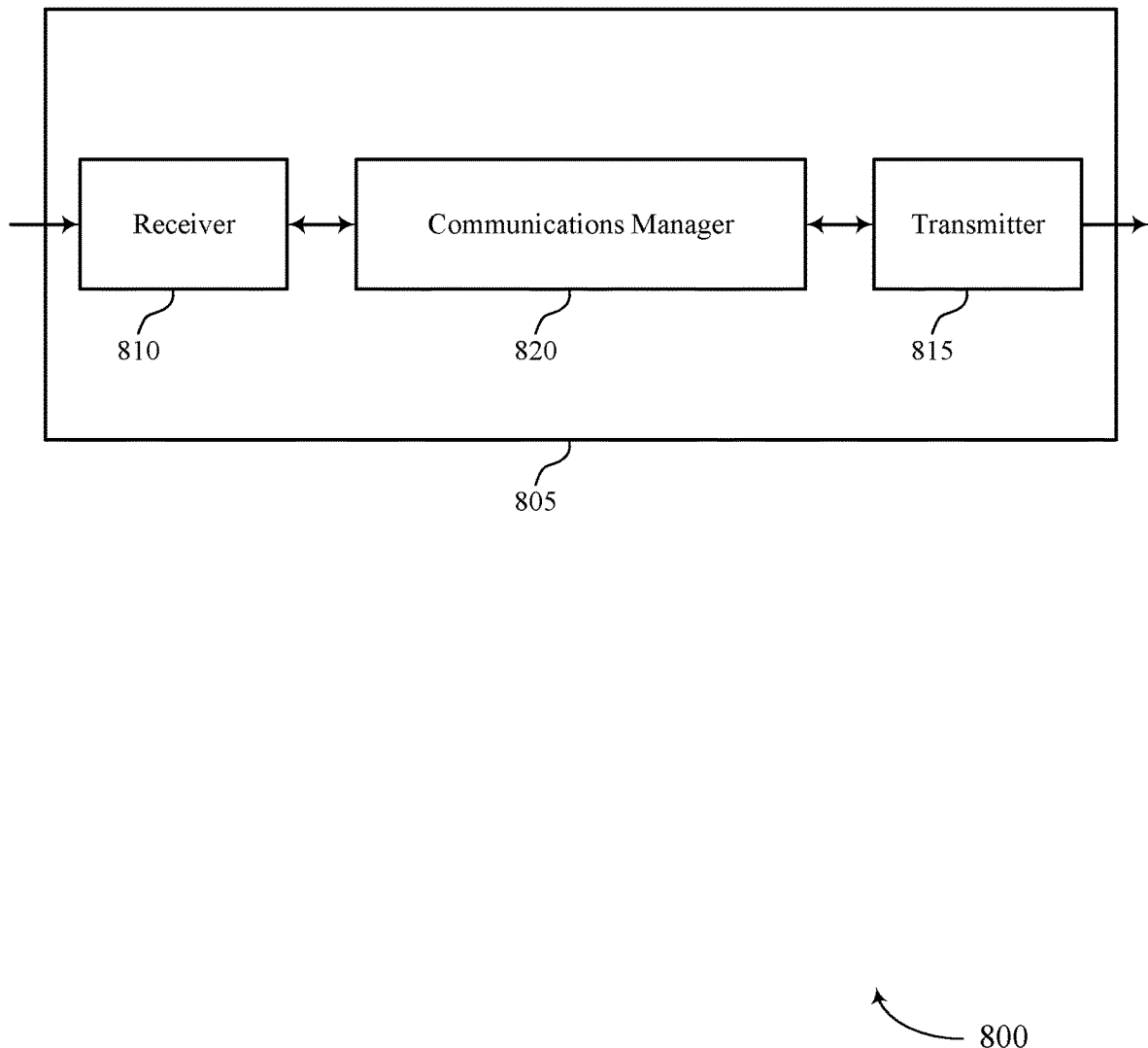
FIGS. 8 and 9 show block diagrams of devices that support script reuse during inter-frequency or IRAT measurements and paging in accordance with aspects of the present disclosure.

FIG. 8 shows a block diagram 800 of a device 805 that supports script reuse during inter-frequency or IRAT measurements and paging in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to script reuse during inter-frequency or IRAT measurements and paging). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to script reuse during inter-frequency or IRAT measurements and paging). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of script reuse during inter-frequency or IRAT measurements and paging as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for identifying that the UE is scheduled to perform a first measurement or paging activity associated with a target cell that is different from a serving cell of the UE, the target cell operating in accordance with a first target cell configuration and the serving cell operating in accordance with a first serving cell configuration. The communications manager 820 may be configured as or otherwise support a means for determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The communications manager 820 may be configured as or otherwise support a means for comparing at least one of the first target cell configuration with the previous target cell configuration or the first serving cell configuration with the previous serving cell configuration. The communications manager 820 may be configured as or otherwise support a means for performing the first measurement or paging activity using a script, where a source of the script is based on the comparing.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for inter-frequency or IRAT measurement and MSIM QTA, which may save power at the UE. By saving and reusing scripts for measurement and paging activities instead of regenerating new scripts, the UE may save time and processor resources and improve network operations, among other benefits.

Figure 9:
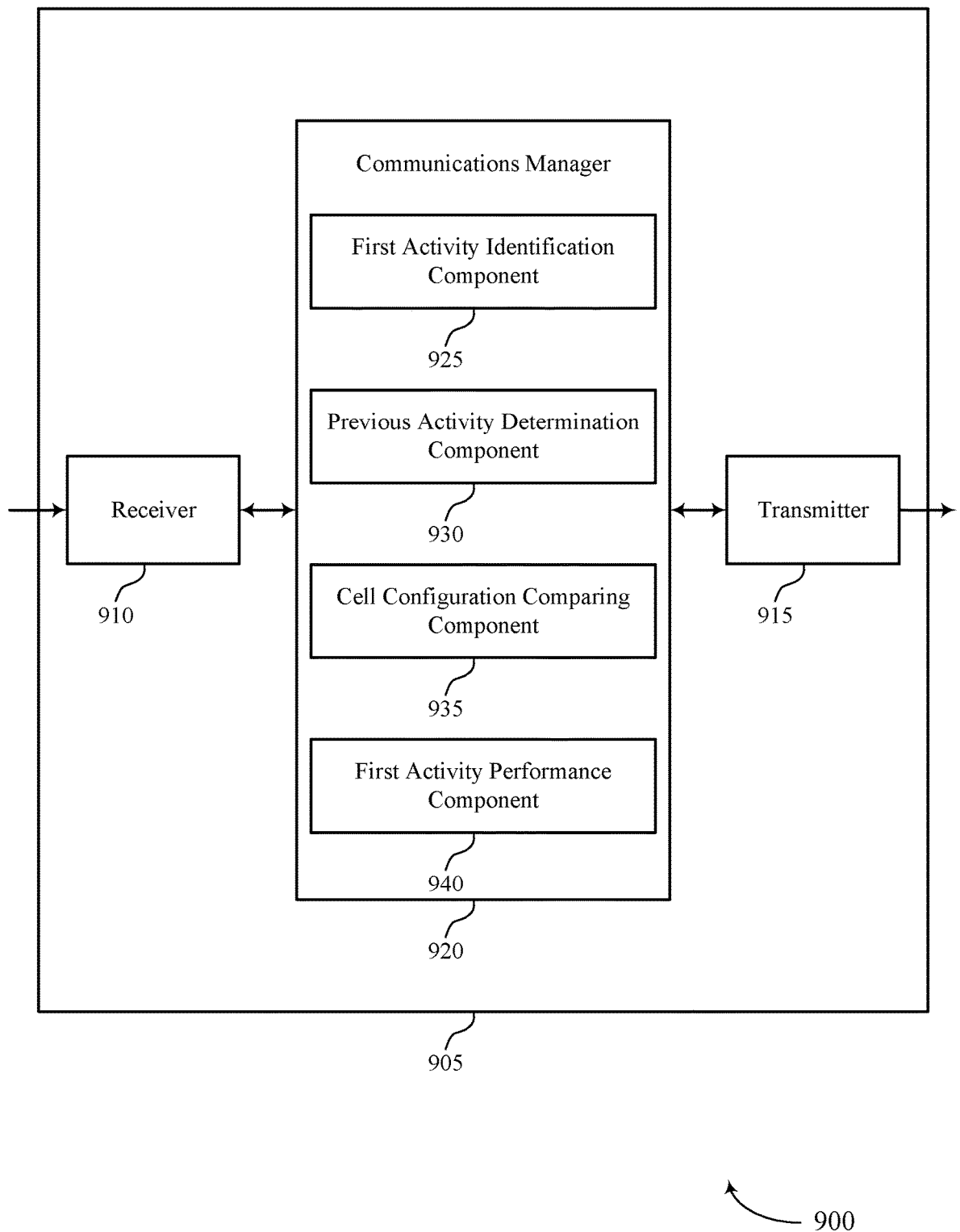

FIG. 9 shows a block diagram 900 of a device 905 that supports script reuse during inter-frequency or IRAT measurements and paging in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to script reuse during inter-frequency or IRAT measurements and paging). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to script reuse during inter-frequency or IRAT measurements and paging). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of script reuse during inter-frequency or IRAT measurements and paging as described herein. For example, the communications manager 920 may include a first activity identification component 925, a previous activity determination component 930, a cell configuration comparing component 935, a first activity performance component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The first activity identification component 925 may be configured as or otherwise support a means for identifying that the UE is scheduled to perform a first measurement or paging activity associated with a target cell that is different from a serving cell of the UE, the target cell operating in accordance with a first target cell configuration and the serving cell operating in accordance with a first serving cell configuration. The previous activity determination component 930 may be configured as or otherwise support a means for determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The cell configuration comparing component 935 may be configured as or otherwise support a means for comparing at least one of the first target cell configuration with the previous target cell configuration or the first serving cell configuration with the previous serving cell configuration. The first activity performance component 940 may be configured as or otherwise support a means for performing the first measurement or paging activity using a script, where a source of the script is based on the comparing.

Figure 10:
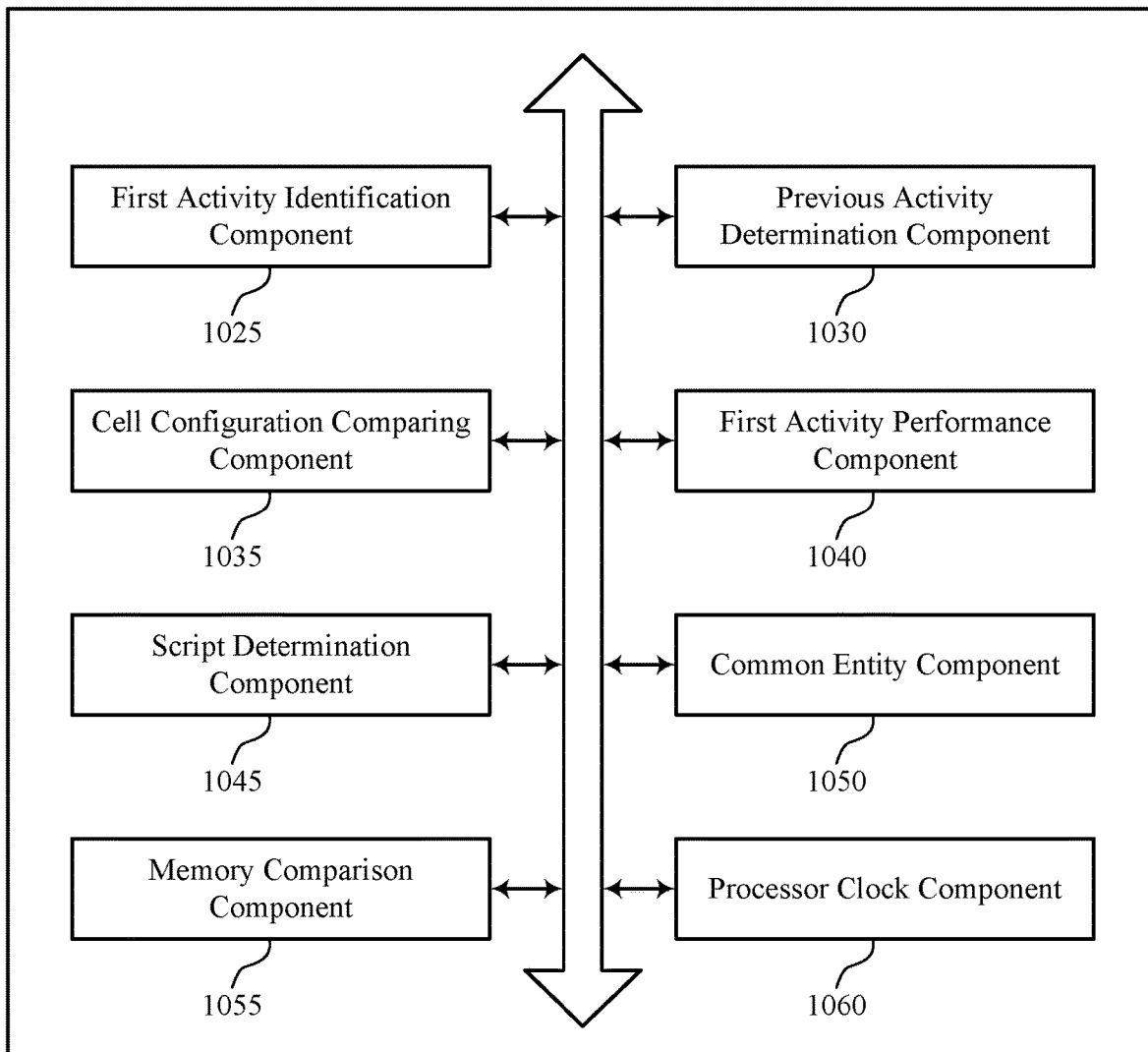
FIG. 10 shows a block diagram of a communications manager that supports script reuse during inter-frequency or IRAT measurements and paging in accordance with aspects of the present disclosure.

FIG. 10 shows a block diagram 1000 of a communications manager 1020 that supports script reuse during inter-frequency or IRAT measurements and paging in accordance with aspects of the present disclosure. The communications manager 1020 may be an example of aspects of a communications manager 820, a communications manager 920, or both, as described herein. The communications manager 1020, or various components thereof, may be an example of means for performing various aspects of script reuse during inter-frequency or IRAT measurements and paging as described herein. For example, the communications manager 1020 may include a first activity identification component 1025, a previous activity determination component 1030, a cell configuration comparing component 1035, a first activity performance component 1040, a script determination component 1045, a common entity component 1050, a memory comparison component 1055, a processor clock component 1060, or any combination thereof. Each of these components may communicate, directly or indirectly, with one another (e.g., via one or more buses).

The communications manager 1020 may support wireless communications at a UE in accordance with examples as disclosed herein. The first activity identification component 1025 may be configured as or otherwise support a means for identifying that the UE is scheduled to perform a first measurement or paging activity associated with a target cell that is different from a serving cell of the UE, the target cell operating in accordance with a first target cell configuration and the serving cell operating in accordance with a first serving cell configuration. The previous activity determination component 1030 may be configured as or otherwise support a means for determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The cell configuration comparing component 1035 may be configured as or otherwise support a means for comparing at least one of the first target cell configuration with the previous target cell configuration or the first serving cell configuration with the previous serving cell configuration. The first activity performance component 1040 may be configured as or otherwise support a means for performing the first measurement or paging activity using a script, where a source of the script is based on the comparing.

In some examples, to support identifying that the UE is scheduled to perform the first measurement or paging activity, the first activity identification component 1025 may be configured as or otherwise support a means for determining that the first measurement or paging activity is associated with an OTA measurement gap for a single SIM UE.

In some examples, to support identifying that the UE is scheduled to perform the first measurement or paging activity, the first activity identification component 1025 may be configured as or otherwise support a means for determining that the first measurement or paging activity is associated with an idle subscription QTA for an MSIM UE.

In some examples, the script determination component 1045 may be configured as or otherwise support a means for determining the source of the script based on the comparing, where the source of the script is either a first script generated in association with the first measurement or paging activity or a previous script generated in association with the previous measurement or paging activity.

In some examples, to support determining the source of the script, the memory comparison component 1055 may be configured as or otherwise support a means for comparing an amount of available memory at the UE with a memory usage of the previous script. In some examples, to support determining the source of the script, the memory comparison component 1055 may be configured as or otherwise support a means for selecting to use either the first script or the previous script based on the available memory and the memory usage.

In some examples, to support determining the source of the script, the script determination component 1045 may be configured as or otherwise support a means for selecting to use either the first script or the previous script based on whether retuning occurs between the first measurement or paging activity and the previous measurement or paging activity, each of the first measurement or paging activity and the previous measurement or paging activity occurring during OTA gaps.

In some examples, to support determining the source of the script, the script determination component 1045 may be configured as or otherwise support a means for selecting to use either the first script or the previous script based on a target frequency for the first measurement or paging activity during an OTA gap.

In some examples, to support determining the source of the script, the common entity component 1050 may be configured as or otherwise support a means for using a common entity during DC operations to monitor for the first target cell configuration on a first RAT and the first serving cell configuration on a second RAT, where the common entity is common between first RAT operations of the UE and second RAT operations of the UE. In some examples, to support determining the source of the script, the common entity component 1050 may be configured as or otherwise support a means for selecting to use either the first script or the previous script based on monitoring by the common entity.

In some examples, to support comparing at least one of the first target cell configuration with the previous target cell configuration or the first serving cell configuration with the previous serving cell configuration, the script determination component 1045 may be configured as or otherwise support a means for comparing at least one of frequency values or bandwidth values of the first target cell configuration with the previous target cell configuration or of the first serving cell configuration with the previous serving cell configuration.

In some examples, the processor clock component 1060 may be configured as or otherwise support a means for refraining from adjusting a processor clock to turbo while performing the first measurement or paging activity using the previous script.

In some examples, the first measurement or paging activity and the previous measurement or paging activity are for different OTA gap cycle measurements, CDRX mode measurements, idle mode search and measurement, or a combination thereof.

In some examples, to support determining the source of the script, the common entity component 1050 may be configured as or otherwise support a means for using a common entity during tune-away from an active subscription to an idle subscription to determine whether the first script or the previous script is to be used, where the common entity is common between the active subscription and the idle subscription.

In some examples, to support using the common entity during tune-away from the active subscription to the idle subscription, the common entity component 1050 may be configured as or otherwise support a means for determining, via the common entity, that paging on the idle subscription, associated with the target cell, uses a same frequency as on the serving cell, which is associated with the active subscription. In some examples, to support using the common entity during tune-away from the active subscription to the idle subscription, the common entity component 1050 may be configured as or otherwise support a means for selecting to use the previous script based on the same frequency being used on both the target cell and the serving cell.

In some examples, to support using the common entity during tune-away from the active subscription to the idle subscription, the common entity component 1050 may be configured as or otherwise support a means for determining, via the common entity, that measurements on the idle subscription, associated with the target cell, use a same frequency as on the serving cell, which is associated with the active subscription. In some examples, to support using the common entity during tune-away from the active subscription to the idle subscription, the common entity component 1050 may be configured as or otherwise support a means for selecting to use the previous script based on the same frequency being used on both the target cell and the serving cell.

In some examples, to support using the common entity during tune-away from the active subscription to the idle subscription, the common entity component 1050 may be configured as or otherwise support a means for determining, via the common entity, that no reconfiguration is applied between different wakeup cycles on either the active subscription or the idle subscription. In some examples, to support using the common entity during tune-away from the active subscription to the idle subscription, the common entity component 1050 may be configured as or otherwise support a means for selecting to use the previous script based on a lack of reconfiguration between different wakeup cycles.

In some examples, the first serving cell configuration and the previous serving cell configuration each include one of LTE operations, NR operations, or ENDC operations.

In some examples, the first target cell configuration and the previous target cell configuration each include one of LTE operations, NR operations, or ENDC operations.

Figure 11:
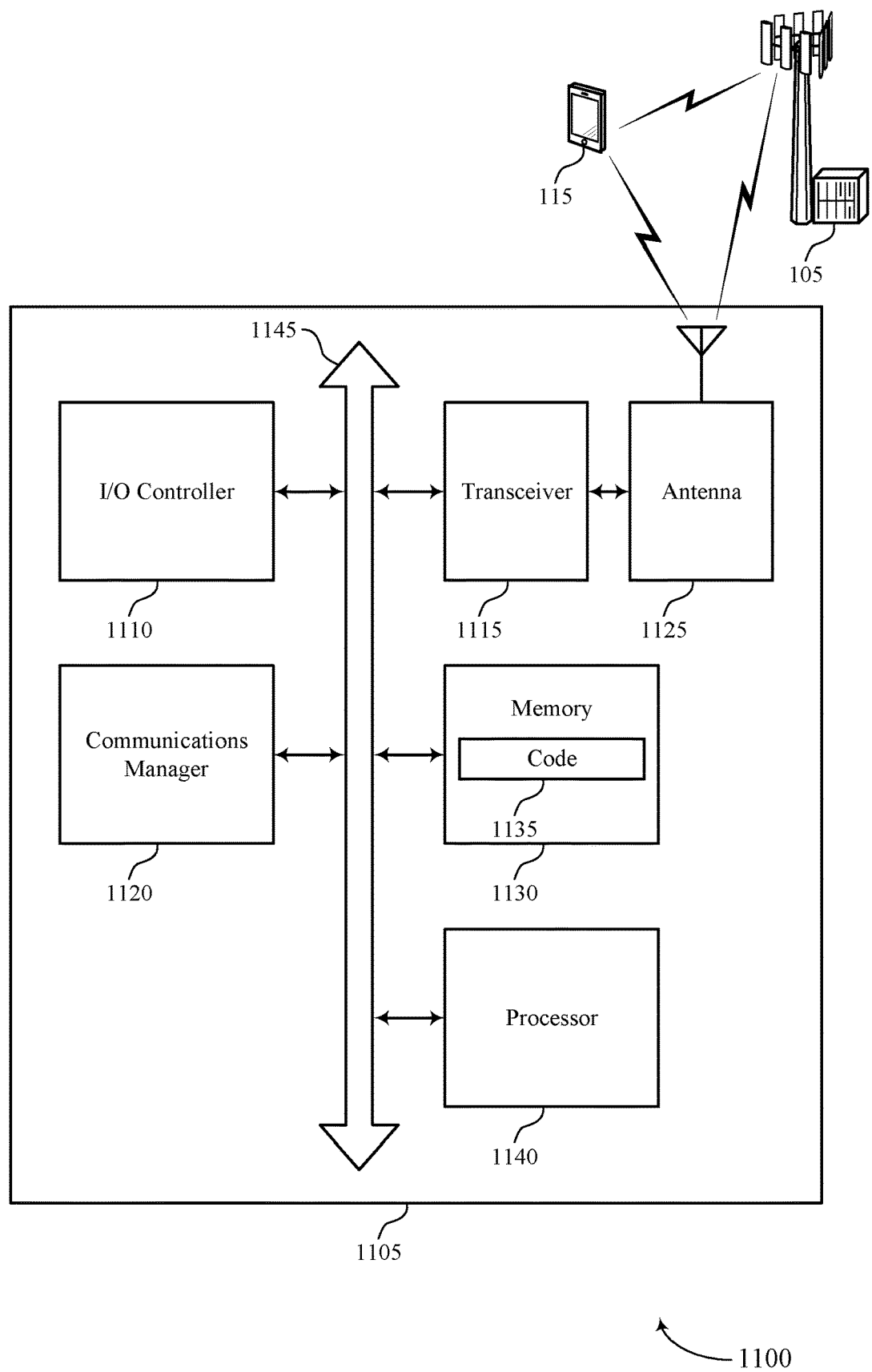
FIG. 11 shows a diagram of a system including a device that supports script reuse during inter-frequency or IRAT measurements and paging in accordance with aspects of the present disclosure.

FIG. 11 shows a diagram of a system 1100 including a device 1105 that supports script reuse during inter-frequency or IRAT measurements and paging in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting script reuse during inter-frequency or IRAT measurements and paging). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for identifying that the UE is scheduled to perform a first measurement or paging activity associated with a target cell that is different from a serving cell of the UE, the target cell operating in accordance with a first target cell configuration and the serving cell operating in accordance with a first serving cell configuration. The communications manager 1120 may be configured as or otherwise support a means for determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The communications manager 1120 may be configured as or otherwise support a means for comparing at least one of the first target cell configuration with the previous target cell configuration or the first serving cell configuration with the previous serving cell configuration. The communications manager 1120 may be configured as or otherwise support a means for performing the first measurement or paging activity using a script, where a source of the script is based on the comparing.

By including or configuring the communications manager 1120 in accordance with examples as described herein, the device 1105 may support techniques for inter-frequency or IRAT measurement and MSIM QTA, which may save power at the UE. By saving and reusing scripts for measurement and paging activities instead of regenerating new scripts, the UE may save time and processor resources and improve network operations, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of script reuse during inter-frequency or IRAT measurements and paging as described herein, or the processor 1140 and the memory 1130 may be otherwise configured to perform or support such operations.

Figure 12:
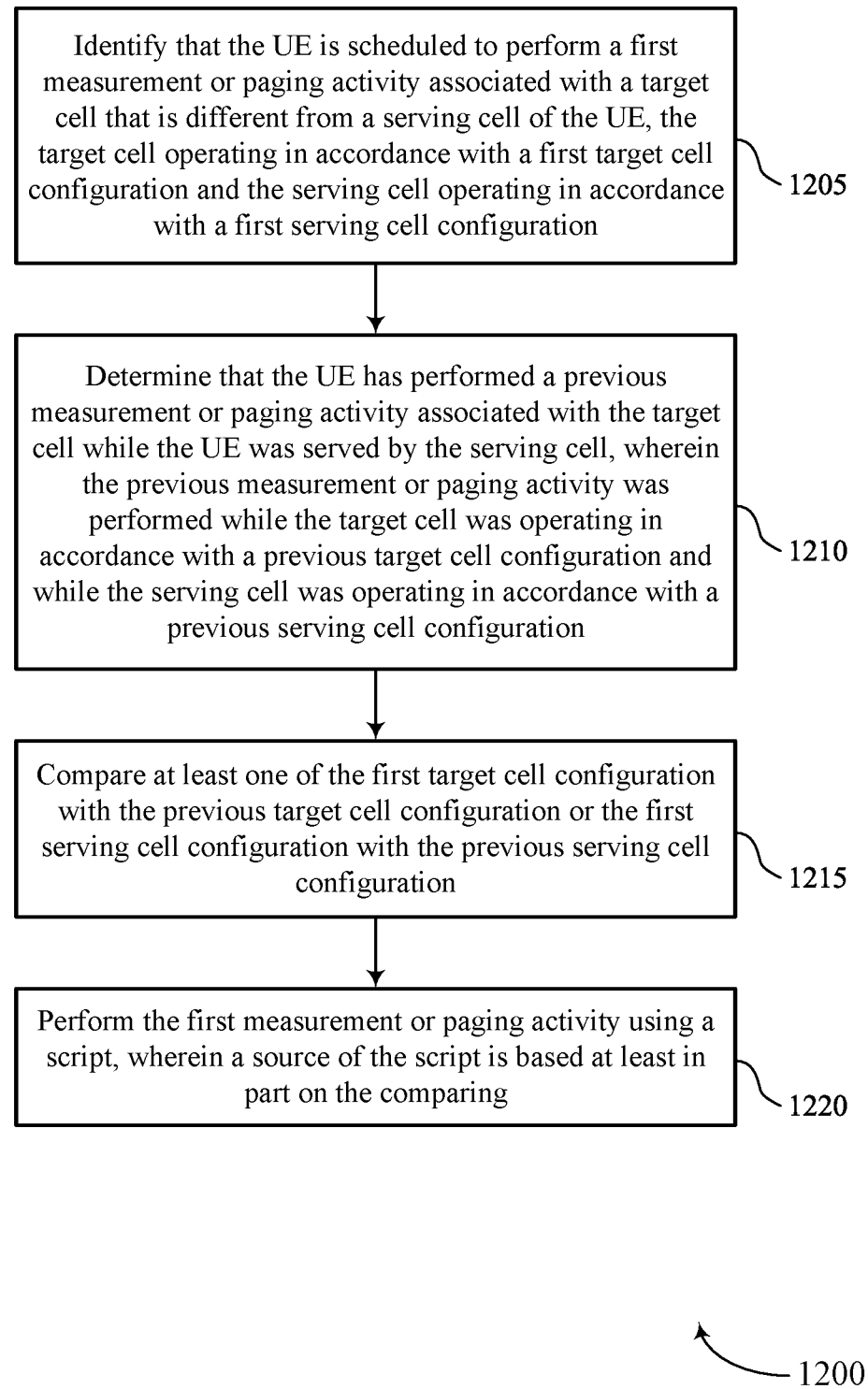
FIGS. 12 through 14 show flowcharts illustrating methods that support script reuse during inter-frequency or IRAT measurements and paging in accordance with aspects of the present disclosure.

FIG. 12 shows a flowchart illustrating a method 1200 that supports script reuse during inter-frequency or IRAT measurements and paging in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include identifying that the UE is scheduled to perform a first measurement or paging activity associated with a target cell that is different from a serving cell of the UE, the target cell operating in accordance with a first target cell configuration and the serving cell operating in accordance with a first serving cell configuration. The operations of 1205 may be performed in accordance with examples as disclosed herein. In some examples, aspects of the operations of 1205 may be performed by a first activity identification component 1025 as described with reference to FIG. 10.

At 1210, the method may include determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The operations of 1210 may be performed in accordance with examples as disclosed herein. In some examples, aspects of the operations of 1210 may be performed by a previous activity determination component 1030 as described with reference to FIG. 10.

At 1215, the method may include comparing at least one of the first target cell configuration with the previous target cell configuration or the first serving cell configuration with the previous serving cell configuration. The operations of 1215 may be performed in accordance with examples as disclosed herein. In some examples, aspects of the operations of 1215 may be performed by a cell configuration comparing component 1035 as described with reference to FIG. 10.

At 1220, the method may include performing the first measurement or paging activity using a script, where a source of the script is based on the comparing. The operations of 1220 may be performed in accordance with examples as disclosed herein. In some examples, aspects of the operations of 1220 may be performed by a first activity performance component 1040 as described with reference to FIG. 10.

Figure 13:
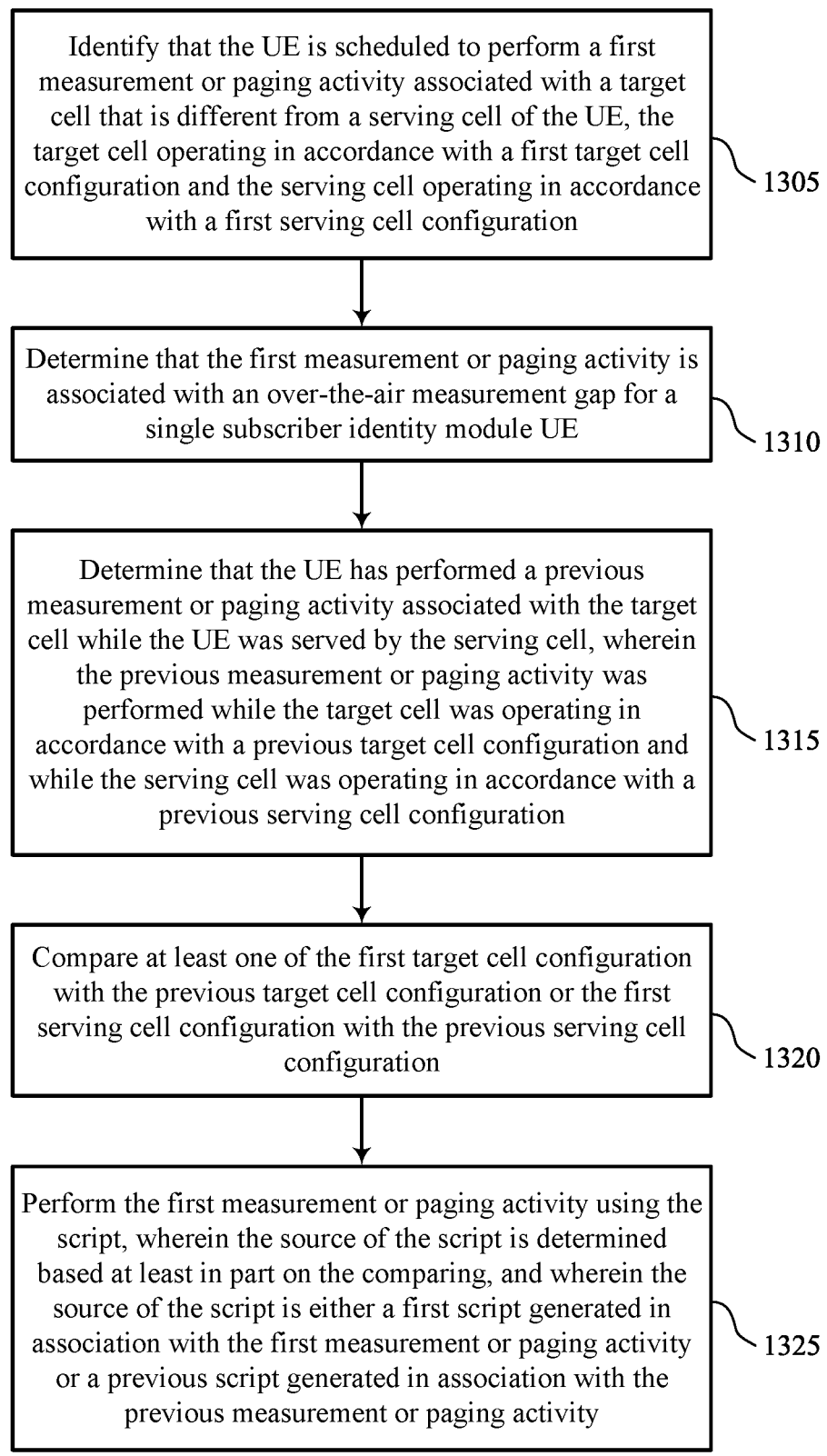

FIG. 13 shows a flowchart illustrating a method 1300 that supports script reuse during inter-frequency or IRAT measurements and paging in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include identifying that the UE is scheduled to perform a first measurement or paging activity associated with a target cell that is different from a serving cell of the UE, the target cell operating in accordance with a first target cell configuration and the serving cell operating in accordance with a first serving cell configuration. The operations of 1305 may be performed in accordance with examples as disclosed herein. In some examples, aspects of the operations of 1305 may be performed by a first activity identification component 1025 as described with reference to FIG. 10.

At 1310, the method may include determining that the first measurement or paging activity is associated with an OTA measurement gap for a single SIM UE. The operations of 1310 may be performed in accordance with examples as disclosed herein. In some examples, aspects of the operations of 1310 may be performed by a first activity identification component 1025 as described with reference to FIG. 10.

At 1315, the method may include determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The operations of 1315 may be performed in accordance with examples as disclosed herein. In some examples, aspects of the operations of 1315 may be performed by a previous activity determination component 1030 as described with reference to FIG. 10.

At 1320, the method may include comparing at least one of the first target cell configuration with the previous target cell configuration or the first serving cell configuration with the previous serving cell configuration. The operations of 1320 may be performed in accordance with examples as disclosed herein. In some examples, aspects of the operations of 1320 may be performed by a cell configuration comparing component 1035 as described with reference to FIG. 10.

At 1325, the method may include performing the first measurement or paging activity using the script, where the source of the script is determined based on the comparing, and where the source of the script is either a first script generated in association with the first measurement or paging activity or a previous script generated in association with the previous measurement or paging activity. The operations of 1325 may be performed in accordance with examples as disclosed herein. In some examples, aspects of the operations of 1325 may be performed by a script determination component 1045 as described with reference to FIG. 10.

Figure 14:
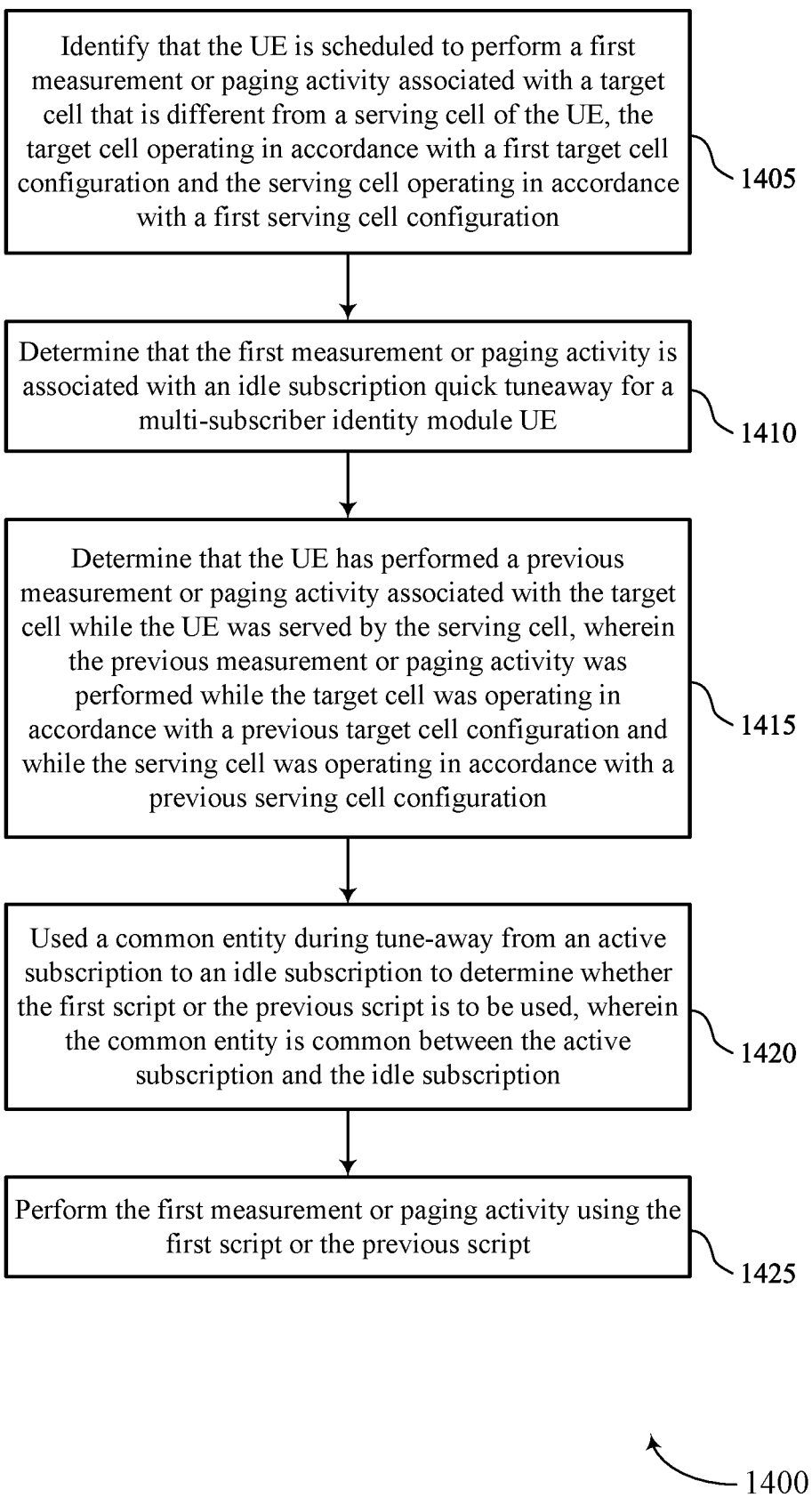

FIG. 14 shows a flowchart illustrating a method 1400 that supports script reuse during inter-frequency or IRAT measurements and paging in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include identifying that the UE is scheduled to perform a first measurement or paging activity associated with a target cell that is different from a serving cell of the UE, the target cell operating in accordance with a first target cell configuration and the serving cell operating in accordance with a first serving cell configuration. The operations of 1405 may be performed in accordance with examples as disclosed herein. In some examples, aspects of the operations of 1405 may be performed by a first activity identification component 1025 as described with reference to FIG. 10.

At 1410, the method may include determining that the first measurement or paging activity is associated with an idle subscription QTA for an MSIM UE. The operations of 1410 may be performed in accordance with examples as disclosed herein. In some examples, aspects of the operations of 1410 may be performed by a first activity identification component 1025 as described with reference to FIG. 10.

At 1415, the method may include determining that the UE has performed a previous measurement or paging activity associated with the target cell while the UE was served by the serving cell, where the previous measurement or paging activity was performed while the target cell was operating in accordance with a previous target cell configuration and while the serving cell was operating in accordance with a previous serving cell configuration. The operations of 1415 may be performed in accordance with examples as disclosed herein. In some examples, aspects of the operations of 1415 may be performed by a previous activity determination component 1030 as described with reference to FIG. 10.

At 1420, the method may include using a common entity during tune-away from an active subscription to an idle subscription to determine whether the first script or the previous script is to be used, where the common entity is common between the active subscription and the idle subscription. The operations of 1420 may be performed in accordance with examples as disclosed herein. In some examples, aspects of the operations of 1420 may be performed by a common entity component 1050 as described with reference to FIG. 10.

At 1425, the method may include performing the first measurement or paging activity using the first script or the previous script. The operations of 1425 may be performed in accordance with examples as disclosed herein. In some examples, aspects of the operations of 1425 may be performed by a first activity performance component 1040 as described with reference to FIG. 10.

The following provides an overview of aspects of the present disclosure:

Aspect 1: A method for wireless communications at a UE, comprising: identifying that the UE is scheduled to perform a first measurement or paging activity associated with a target cell that is different from a serving cell of the UE, the target cell operating in accordance with a first target cell configuration and the serving cell operating in accordance with a first serving cell configuration; determining that the UE has performed a previous measurement or paging activity associated with the target cell while the UE was served by the serving cell, wherein the previous measurement or paging activity was performed while the target cell was operating in accordance with a previous target cell configuration and while the serving cell was operating in accordance with a previous serving cell configuration; comparing at least one of the first target cell configuration with the previous target cell configuration or the first serving cell configuration with the previous serving cell configuration; and performing the first measurement or paging activity using a script, wherein a source of the script is based at least in part on the comparing.

Aspect 2: The method of aspect 1, wherein identifying that the UE is scheduled to perform the first measurement or paging activity further comprises: determining that the first measurement or paging activity is associated with an OTA measurement gap for a single SIM UE.

Aspect 3: The method of any of aspects 1 through 2, wherein identifying that the UE is scheduled to perform the first measurement or paging activity further comprises: determining that the first measurement or paging activity is associated with an idle subscription QTA for an MSIM UE.

Aspect 4: The method of any of aspects 1 through 3, further comprising: determining the source of the script based at least in part on the comparing, wherein the source of the script is either a first script generated in association with the first measurement or paging activity or a previous script generated in association with the previous measurement or paging activity.

Aspect 5: The method of aspect 4, wherein determining the source of the script further comprises: comparing an amount of available memory at the UE with a memory usage of the previous script; and selecting to use either the first script or the previous script based at least in part on the available memory and the memory usage.

Aspect 6: The method of any of aspects 4 through 5, wherein determining the source of the script further comprises: selecting to use either the first script or the previous script based at least in part on whether retuning occurs between the first measurement or paging activity and the previous measurement or paging activity, each of the first measurement or paging activity and the previous measurement or paging activity occurring during OTA gaps.

Aspect 7: The method of any of aspects 4 through 6, wherein determining the source of the script further comprises: selecting to use either the first script or the previous script based at least in part on a target frequency for the first measurement or paging activity during an OTA gap.

Aspect 8: The method of any of aspects 4 through 7, wherein determining the source of the script further comprises: using a common entity during DC operations to monitor for the first target cell configuration on a first RAT and the first serving cell configuration on a second RAT, wherein the common entity is common between first RAT operations of the UE and second RAT operations of the UE; and selecting to use either the first script or the previous script based at least in part on monitoring by the common entity.

Aspect 9: The method of any of aspects 4 through 8, wherein comparing at least one of the first target cell configuration with the previous target cell configuration or the first serving cell configuration with the previous serving cell configuration further comprises: comparing at least one of frequency values or bandwidth values of the first target cell configuration with the previous target cell configuration or of the first serving cell configuration with the previous serving cell configuration.

Aspect 10: The method of any of aspects 4 through 9, further comprising: refraining from adjusting a processor clock to turbo while performing the first measurement or paging activity using the previous script.

Aspect 11: The method of any of aspects 1 through 10, wherein the first measurement or paging activity and the previous measurement or paging activity are for different OTA gap cycle measurements, CDRX mode measurements, idle mode search and measurement, or a combination thereof.

Aspect 12: The method of any of aspects 1 through 11, wherein determining the source of the script further comprises: using a common entity during tune-away from an active subscription to an idle subscription to determine whether the first script or the previous script is to be used, wherein the common entity is common between the active subscription and the idle subscription.

Aspect 13: The method of aspect 12, wherein using the common entity during tune-away from the active subscription to the idle subscription further comprises: determining, via the common entity, that paging on the idle subscription, associated with the target cell, uses a same frequency as on the serving cell, which is associated with the active subscription; and selecting to use the previous script based at least in part on the same frequency being used on both the target cell and the serving cell.

Aspect 14: The method of any of aspects 12 through 13, wherein using the common entity during tune-away from the active subscription to the idle subscription further comprises: determining, via the common entity, that measurements on the idle subscription, associated with the target cell, use a same frequency as on the serving cell, which is associated with the active subscription; and selecting to use the previous script based at least in part on the same frequency being used on both the target cell and the serving cell.

Aspect 15: The method of any of aspects 12 through 14, wherein using the common entity during tune-away from the active subscription to the idle subscription further comprises: determining, via the common entity, that no reconfiguration is applied between different wakeup cycles on either the active subscription or the idle subscription; and selecting to use the previous script based at least in part on a lack of reconfiguration between different wakeup cycles.

Aspect 16: The method of any of aspects 1 through 15, wherein the first serving cell configuration and the previous serving cell configuration each comprise one of LTE operations, NR operations, or ENDC operations.

Aspect 17: The method of any of aspects 1 through 16, wherein the first target cell configuration and the previous target cell configuration each comprise one of LTE operations, NR operations, or ENDC operations.

Aspect 18: An apparatus for wireless communications at a UE, comprising a processor; memory coupled with the processor; and instructions stored in the memory and executable by the processor to cause the apparatus to perform a method of any of aspects 1 through 17.

Aspect 19: An apparatus for wireless communications at a UE, comprising at least one means for performing a method of any of aspects 1 through 17.

Aspect 20: A non-transitory computer-readable medium storing code for wireless communications at a UE, the code comprising instructions executable by a processor to perform a method of any of aspects 1 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    identifying that the UE is scheduled to perform a first measurement or paging activity associated with a target cell that is different from a serving cell of the UE, the target cell operating in accordance with a first target cell configuration and the serving cell operating in accordance with a first serving cell configuration;
    determining that the UE has performed a previous measurement or paging activity associated with the target cell while the UE was served by the serving cell, wherein the previous measurement or paging activity was performed while the target cell was operating in accordance with a previous target cell configuration and while the serving cell was operating in accordance with a previous serving cell configuration;
    comparing at least one of the first target cell configuration with the previous target cell configuration or the first serving cell configuration with the previous serving cell configuration; and
    performing the first measurement or paging activity using a script, wherein a source of the script is based at least in part on the comparing.

2. The method of claim 1, wherein identifying that the UE is scheduled to perform the first measurement or paging activity further comprises:
    determining that the first measurement or paging activity is associated with an over-the-air measurement gap for a single subscriber identity module UE.

3. The method of claim 1, wherein identifying that the UE is scheduled to perform the first measurement or paging activity further comprises:
    determining that the first measurement or paging activity is associated with an idle subscription quick tuneaway for a multi-subscriber identity module UE.

4. The method of claim 1, further comprising:
    determining the source of the script based at least in part on the comparing, wherein the source of the script is either a first script generated in association with the first measurement or paging activity or a previous script generated in association with the previous measurement or paging activity.

5. The method of claim 4, wherein determining the source of the script further comprises:
    comparing an amount of available memory at the UE with a memory usage of the previous script; and
    selecting to use either the first script or the previous script based at least in part on the available memory and the memory usage.

6. The method of claim 4, wherein determining the source of the script further comprises:
    selecting to use either the first script or the previous script based at least in part on whether retuning occurs between the first measurement or paging activity and the previous measurement or paging activity, each of the first measurement or paging activity and the previous measurement or paging activity occurring during over-the-air gaps.

7. The method of claim 4, wherein determining the source of the script further comprises:
    selecting to use either the first script or the previous script based at least in part on a target frequency for the first measurement or paging activity during an over-the-air gap.

8. The method of claim 4, wherein determining the source of the script further comprises:
    using a common entity during dual connectivity operations to monitor for the first target cell configuration on a first radio access technology and the first serving cell configuration on a second radio access technology, wherein the common entity is common between first radio access technology operations of the UE and second radio access technology operations of the UE; and
    selecting to use either the first script or the previous script based at least in part on monitoring by the common entity.

9. The method of claim 4, wherein comparing at least one of the first target cell configuration with the previous target cell configuration or the first serving cell configuration with the previous serving cell configuration further comprises:
    comparing at least one of frequency values or bandwidth values of the first target cell configuration with the previous target cell configuration or of the first serving cell configuration with the previous serving cell configuration.

10. The method of claim 4, further comprising:
    refraining from adjusting a processor clock to turbo while performing the first measurement or paging activity using the previous script.

11. The method of claim 1, wherein the first measurement or paging activity and the previous measurement or paging activity are for different over-the-air gap cycle measurements, connected discontinuous reception mode measurements, idle mode search and measurement, or a combination thereof.

12. The method of claim 1, wherein determining the source of the script further comprises:
    using a common entity during tune-away from an active subscription to an idle subscription to determine whether the first script or the previous script is to be used, wherein the common entity is common between the active subscription and the idle subscription.

13. The method of claim 12, wherein using the common entity during tune-away from the active subscription to the idle subscription further comprises:
determining, via the common entity, that paging on the idle subscription, associated with the target cell, uses a same frequency as on the serving cell, which is associated with the active subscription; and
selecting to use the previous script based at least in part on the same frequency being used on both the target cell and the serving cell.

14. The method of claim 12, wherein using the common entity during tune-away from the active subscription to the idle subscription further comprises:
determining, via the common entity, that measurements on the idle subscription, associated with the target cell, use a same frequency as on the serving cell, which is associated with the active subscription; and
selecting to use the previous script based at least in part on the same frequency being used on both the target cell and the serving cell.

15. The method of claim 12, wherein using the common entity during tune-away from the active subscription to the idle subscription further comprises:
determining, via the common entity, that no reconfiguration is applied between different wakeup cycles on either the active subscription or the idle subscription; and
selecting to use the previous script based at least in part on a lack of reconfiguration between different wakeup cycles.

16. The method of claim 1, wherein the first serving cell configuration and the previous serving cell configuration each comprise one of Long Term Evolution operations, New Radio operations, or New Radio dual connectivity operations.

17. The method of claim 1, wherein the first target cell configuration and the previous target cell configuration each comprise one of Long Term Evolution operations, New Radio operations, or New Radio dual connectivity operations.

18. An apparatus for wireless communications at a user equipment (UE), comprising:
a processor;
memory coupled with the processor; and
instructions stored in the memory and executable by the processor to cause the apparatus to:
identify that the UE is scheduled to perform a first measurement or paging activity associated with a target cell that is different from a serving cell of the UE, the target cell operating in accordance with a first target cell configuration and the serving cell operating in accordance with a first serving cell configuration;
determine that the UE has performed a previous measurement or paging activity associated with the target cell while the UE was served by the serving cell, wherein the previous measurement or paging activity was performed while the target cell was operating in accordance with a previous target cell configuration and while the serving cell was operating in accordance with a previous serving cell configuration;
compare at least one of the first target cell configuration with the previous target cell configuration or the first serving cell configuration with the previous serving cell configuration; and
perform the first measurement or paging activity using a script, wherein a source of the script is based at least in part on the comparing.

19. The apparatus of claim 18, wherein the instructions to identify that the UE is scheduled to perform the first measurement or paging activity are further executable by the processor to cause the apparatus to:
determine that the first measurement or paging activity is associated with an over-the-air measurement gap for a single subscriber identity module UE.

20. The apparatus of claim 18, wherein the instructions to identify that the UE is scheduled to perform the first measurement or paging activity are further executable by the processor to cause the apparatus to:
determine that the first measurement or paging activity is associated with an idle subscription quick tuneaway for a multi-subscriber identity module UE.

21. The apparatus of claim 18, wherein the instructions are further executable by the processor to cause the apparatus to:
determine the source of the script based at least in part on the comparing, wherein the source of the script is either a first script generated in association with the first measurement or paging activity or a previous script generated in association with the previous measurement or paging activity.

22. The apparatus of claim 21, wherein the instructions to determine the source of the script are further executable by the processor to cause the apparatus to:
compare an amount of available memory at the UE with a memory usage of the previous script; and
select to use either the first script or the previous script based at least in part on the available memory and the memory usage.

23. The apparatus of claim 21, wherein the instructions to determine the source of the script are further executable by the processor to cause the apparatus to:
select to use either the first script or the previous script based at least in part on whether retuning occurs between the first measurement or paging activity and the previous measurement or paging activity, each of the first measurement or paging activity and the previous measurement or paging activity occurring during over-the-air gaps.

24. The apparatus of claim 21, wherein the instructions to determine the source of the script are further executable by the processor to cause the apparatus to:
select to use either the first script or the previous script based at least in part on a target frequency for the first measurement or paging activity during an over-the-air gap.

25. The apparatus of claim 21, wherein the instructions to determine the source of the script are further executable by the processor to cause the apparatus to:
used a common entity during dual connectivity operations to monitor for the first target cell configuration on a first radio access technology and the first serving cell configuration on a second radio access technology, wherein the common entity is common between first radio access technology operations of the UE and second radio access technology operations of the UE; and
select to use either the first script or the previous script based at least in part on monitoring by the common entity.

26. The apparatus of claim 21, wherein the instructions to compare at least one of the first target cell configuration with the previous target cell configuration or the first serving cell configuration with the previous serving cell configuration are further executable by the processor to cause the apparatus to:

compare at least one of frequency values or bandwidth values of the first target cell configuration with the previous target cell configuration or of the first serving cell configuration with the previous serving cell configuration.

27. The apparatus of claim 21, wherein the instructions are further executable by the processor to cause the apparatus to:

refrain from adjusting a processor clock to turbo while performing the first measurement or paging activity using the previous script.

28. The apparatus of claim 18, wherein the first measurement or paging activity and the previous measurement or paging activity are for different over-the-air gap cycle measurements, connected discontinuous reception mode measurements, idle mode search and measurement, or a combination thereof.

29. An apparatus for wireless communications at a user equipment (UE), comprising:

means for identifying that the UE is scheduled to perform a first measurement or paging activity associated with a target cell that is different from a serving cell of the UE, the target cell operating in accordance with a first target cell configuration and the serving cell operating in accordance with a first serving cell configuration;

means for determining that the UE has performed a previous measurement or paging activity associated with the target cell while the UE was served by the serving cell, wherein the previous measurement or paging activity was performed while the target cell was operating in accordance with a previous target cell configuration and while the serving cell was operating in accordance with a previous serving cell configuration;

means for comparing at least one of the first target cell configuration with the previous target cell configuration or the first serving cell configuration with the previous serving cell configuration; and means for performing the first measurement or paging activity using a script, wherein a source of the script is based at least in part on the comparing.

30. A non-transitory computer-readable medium storing code for wireless communications at a user equipment (UE), the code comprising instructions executable by a processor to:

identify that the UE is scheduled to perform a first measurement or paging activity associated with a target cell that is different from a serving cell of the UE, the target cell operating in accordance with a first target cell configuration and the serving cell operating in accordance with a first serving cell configuration;

determine that the UE has performed a previous measurement or paging activity associated with the target cell while the UE was served by the serving cell, wherein the previous measurement or paging activity was performed while the target cell was operating in accordance with a previous target cell configuration and while the serving cell was operating in accordance with a previous serving cell configuration;

compare at least one of the first target cell configuration with the previous target cell configuration or the first serving cell configuration with the previous serving cell configuration; and perform the first measurement or paging activity using a script, wherein a source of the script is based at least in part on the comparing.

* * * * *